(12) United States Patent
Jiang et al.

(10) Patent No.: US 11,119,939 B2
(45) Date of Patent: Sep. 14, 2021

(54) METHODS AND SYSTEMS FOR MEMORY MANAGEMENT OF KERNEL AND USER SPACES

(71) Applicant: ALIBABA GROUP HOLDING LIMITED, Grand Cayman (KY)

(72) Inventors: Xiaowei Jiang, San Mateo, CA (US); Shu Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/682,437

(22) Filed: Aug. 21, 2017

(65) Prior Publication Data

US 2019/0057040 A1 Feb. 21, 2019

(51) Int. Cl.
 *G06F 12/1009* (2016.01)
 *G06F 12/14* (2006.01)

(52) U.S. Cl.
 CPC ...... *G06F 12/1009* (2013.01); *G06F 12/1491* (2013.01); *G06F 2212/1052* (2013.01); *G06F 2212/651* (2013.01)

(58) Field of Classification Search
 None
 See application file for complete search history.

(56) References Cited

U.S. PATENT DOCUMENTS

| 10,002,084 | B1* | 6/2018 | Warkentin | G06F 12/1491 |
| 2003/0200402 | A1* | 10/2003 | Willman | G06F 12/145 |
| | | | | 711/154 |
| 2008/0034194 | A1* | 2/2008 | Peak | G06F 9/30181 |
| | | | | 712/244 |
| 2012/0246381 | A1 | 9/2012 | Kegel et al. | |
| 2013/0117530 | A1* | 5/2013 | Kim | G06F 9/45558 |
| | | | | 711/206 |
| 2016/0350543 | A1* | 12/2016 | Kong | G06F 21/566 |

OTHER PUBLICATIONS

PCT Notification of Transmittal of the International Search Report and the Written Opinion dated Nov. 7, 2018, issued in corresponding International Application No. PCT/US2018/47201 (14 pages).

* cited by examiner

*Primary Examiner* — Charles Rones
*Assistant Examiner* — Ryan Dare
(74) *Attorney, Agent, or Firm* — Finnegan, Henderson, Farabow, Garrett & Dunner, LLP

(57) ABSTRACT

The present application provides methods and systems for memory management of a kernel space and a user space. An exemplary system for memory management of the kernel space and the user space may include a first storing unit configured to store a first root page table index corresponding to the kernel space. The system may also include a second storing unit configured to store a second root page table index corresponding to the user space. The system may further include a control unit communicatively coupled to the first and second registers and configured to: translate a first virtual address to a first physical address in accordance with the first root page table index for an operating system kernel, and translate a second virtual address to a second physical address in accordance with the second root page table index for a user process.

33 Claims, 10 Drawing Sheets

METHODS AND SYSTEMS FOR MEMORY MANAGEMENT OF KERNEL AND USER SPACES

TECHNICAL FIELD

The present application relates to memory management, and more particularly, to methods and systems for memory management of kernel and user spaces in computers.

BACKGROUND

In a conventional computer, instructions and/or data stored in a memory may be addressed by using virtual addresses. When a process needs to access the instructions and/or data, it may be necessary to translate the virtual addresses into physical addresses of the memory and retrieve the instructions and/or data accordingly. An operating system (OS) kernel may use one or more page tables for translating virtual addresses into physical addresses. For example, a Linux kernel may use three-level page tables for translating a 32-bit virtual address to a 32-bit physical address with a page size of 4 kilobytes (KB).

Currently, an OS kernel may divide virtual addresses into a kernel space and a user space for the OS kernel (or another OS kernel) and user processes, respectively. The kernel space is generally processed at a high central processing unit (CPU) privilege level while the user space may be dealt with a low CPU privilege level. The OS kernel and the user processes each may have their own root page table indies, but they generally share the same page tables for virtual-to-physical address mapping. However, such a design may not utilize the memory space in an efficient way. Furthermore, it may raise security concerns. For example, an attacker may trick the OS kernel to execute a malicious program in the user space through those common page tables among the OS kernel and the user processes. Moreover, in another aspect, a typical page table entry may not have room available for emerging features, such as a No-eXecute (NX) bit to enhance virus protection in a 32-bit computer system. It would be desirable to have new methods and systems for memory management of kernel and user spaces to enhance protection against malware, spyware, and/or viruses.

SUMMARY

Embodiments of the present disclosure provide improved methods and systems for memory management of kernel and user spaces in computers, apparatuses, or systems.

These embodiments include a system for memory management of a kernel space and a user space. The system may include a first storing unit configured to store a first root page table index corresponding to the kernel space. The system may also include a second storing unit configured to store a second root page table index corresponding to the user space. The system may further include a control unit communicatively coupled to the first and second registers and configured to: translate a first virtual address to a first physical address in accordance with the first root page table index for an operating system kernel, and translate a second virtual address to a second physical address in accordance with the second root page table index for a user process.

These embodiments also include a method for memory management of a kernel space and a user space. The method may include obtaining a first root page table index corresponding to the kernel space. The method may also include obtaining a second root page table index corresponding to the user space. The method may further include translating a first virtual address to a first physical address in accordance with the first root page table index for an operating system kernel. In addition, the method may include translating a second virtual address to a second physical address in accordance with the second root page table index for a user process.

Moreover, these embodiments include a non-transitory computer-readable medium storing instructions that are executable by one or more processors of an apparatus to perform a method for memory management of a kernel space and a user space. The method may include obtaining a first root page table index corresponding to the kernel space. The method may also include obtaining a second root page table index corresponding to the user space. The method may further include translating a first virtual address to a first physical address in accordance with the first root page table index for an operating system kernel. In addition, the method may include translating a second virtual address to a second physical address in accordance with the second root page table index for a user process.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Reference will now be made to the accompanying drawings showing exemplary embodiments of this disclosure. In the drawings.

DETAILED DESCRIPTION

Figure 1:
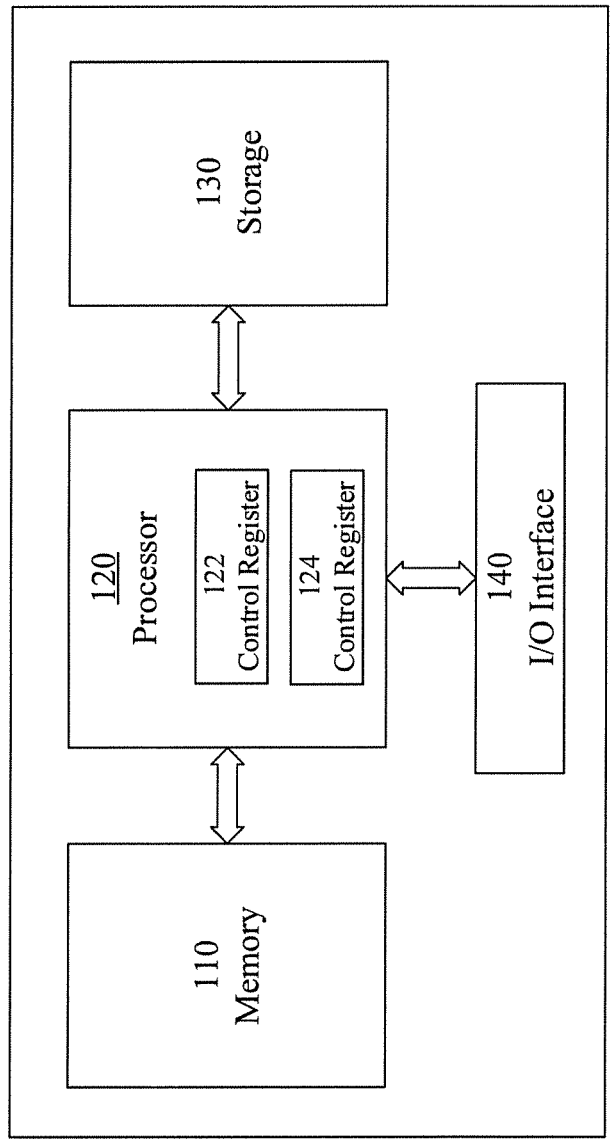
FIG. 1 illustrates a block diagram of an exemplary computer system for memory management of kernel and user spaces, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide improved methods and systems for memory management of kernel and user spaces in computers, apparatuses, or systems. The embodiments described herein can respectively assign an OS kernel and a user process dedicated registers to store their root page table indices for memory management of kernel and user spaces. The OS kernel and the user process are also respectively provided with their page directories, page tables, and page table entries for virtual-to-physical address mapping. The virtual-to-physical address mapping of the OS kernel and the user process can be respectively mapped to an entire physical memory space. For example, the OS kernel and the user process can respectively have a kernel space and a user space of 4 gigabytes (GB) corresponding to an entire physical memory space of 4 GB in a 32-bit computer system. Alternatively, the virtual-to-physical address mapping of the OS kernel and the user process can also be respectively mapped to a part of an entire physical memory space. For example, the OS kernel and the user process can respectively have a kernel space and a user space of 32 GB corresponding to a part of an entire physical memory space of 16 exabytes (EB) (i.e. $16 \times 10^9$ GB) in a 64-bit computer system. It can thereby improve the memory space usages and remove relative security vulnerabilities.

Accordingly, the OS kernel may be protected from malware, spyware, and/or viruses by respectively translating virtual to physical addresses for the OS kernel and the user process. In addition, while the translations of virtual to physical addresses are performed separately, a typical page table entry may have room yielded for emerging features, such as a No-eXecute (NX) bit to enhance virus protection in a 32-bit computer system. Accordingly, the security of the computer system may be enhanced and improved.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

FIG. 1 illustrates a block diagram of an exemplary computer system 100 for memory management of kernel and user spaces, according to some embodiments of the present disclosure. In some embodiments, computer system 100 may include a memory 110, a processor 120, a storage 130, and an input/output (I/O) interface 140.

Memory 110 may include any appropriate type of mass storage provided to store any type of information that processor 120 may need to operate. For example, memory 110 may include dynamic random access memory (DRAM) and may be configured to be the main memory of computer system 100. In some embodiments, memory 110 may be a volatile or non-volatile, magnetic, semiconductor, tape, optical, removable, non-removable, or other type of storage device or tangible and/or non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, any other memory chip or cartridge, and networked versions of the same.

In some embodiments, memory 110 may be configured to store one or more computer programs that may be executed by processor 120 to perform exemplary memory management method disclosed in this application. For example, memory 110 may be configured to store program(s) that may be executed by processor 120 to manage kernel and user spaces of memory, as described in the present disclosure. As another example, memory 110 may be configured to store an OS kernel that may be executed by processor 120 to operate the whole system of computer system 100, such as memory management, process management, resource allocation, I/O device management, inter-process communication, multi-task scheduling, system calls and interrupt handling, and security or protection management.

In some embodiments, memory 110 may also be configured to store information and data for processor 120 to access. For example, memory 110 may be configured to store voice, video, or document data that processor 120 may access when executing a user process. In some embodiments, when memory 110 may not contain data or programs that processor 120 would like to access, the OS kernel, executed by processor 120, may move some pages out of memory 110 and move the required data or programs into memory 110 from storage 130. This procedure may also be called swapping, and may be used to ensure required data or programs available in memory 110 for processor 120.

A physical address may be a memory address that points to, or addresses, a position of memory 110, and may enable processor 120 to access data or programs at the position in memory 110 accordingly. For example, a 32-bit OS may include a memory address of 32 bits. A 32-bit memory address may point up to 4 gigabytes (GB) of memory 110.

A virtual address, on the other hand, may be a memory address that points to, or addresses, a virtual memory for a process. An OS kernel may create and manage a virtual memory for each process, such as the OS kernel itself, another OS kernel, or each of user processes. Through the virtual memory, the process may be free from having to manage a shared physical memory space, may have increased security due to memory isolation, and may be able to conceptually use more memory than that may be physically available using a paging technique. For example, a 32-bit Microsoft Windows may include a virtual memory of 4 GB. Each process in the 32-bit Windows may use the virtual address space of 4 GB as its memory. Each process may not need to manage a shared physical memory space, and may not need to manage translations from virtual addresses to physical addresses.

For some processes, a virtual address may be mapped to a physical address of memory 110. Alternatively, a virtual address may be mapped to a physical address of memory 110 and/or storage 130. The OS kernel may manage translations between virtual and physical addresses for each process through its memory management function. The OS kernel can create one or more page tables to translate a virtual address to a corresponding physical address for each process. For example, a 32-bit Linux kernel, running on an x86 central processing unit (CPU) and using a page size of 4 KB, may create and manage a three-level page table structure in its main memory for each process. The three levels may include a page directory, a page table, and a page table entry levels. The OS kernel may maintain a root page table index for each process, and may use such a root page table index and the three-level page tables to translate virtual addresses to physical addresses of memory 110.

Figure 2A:
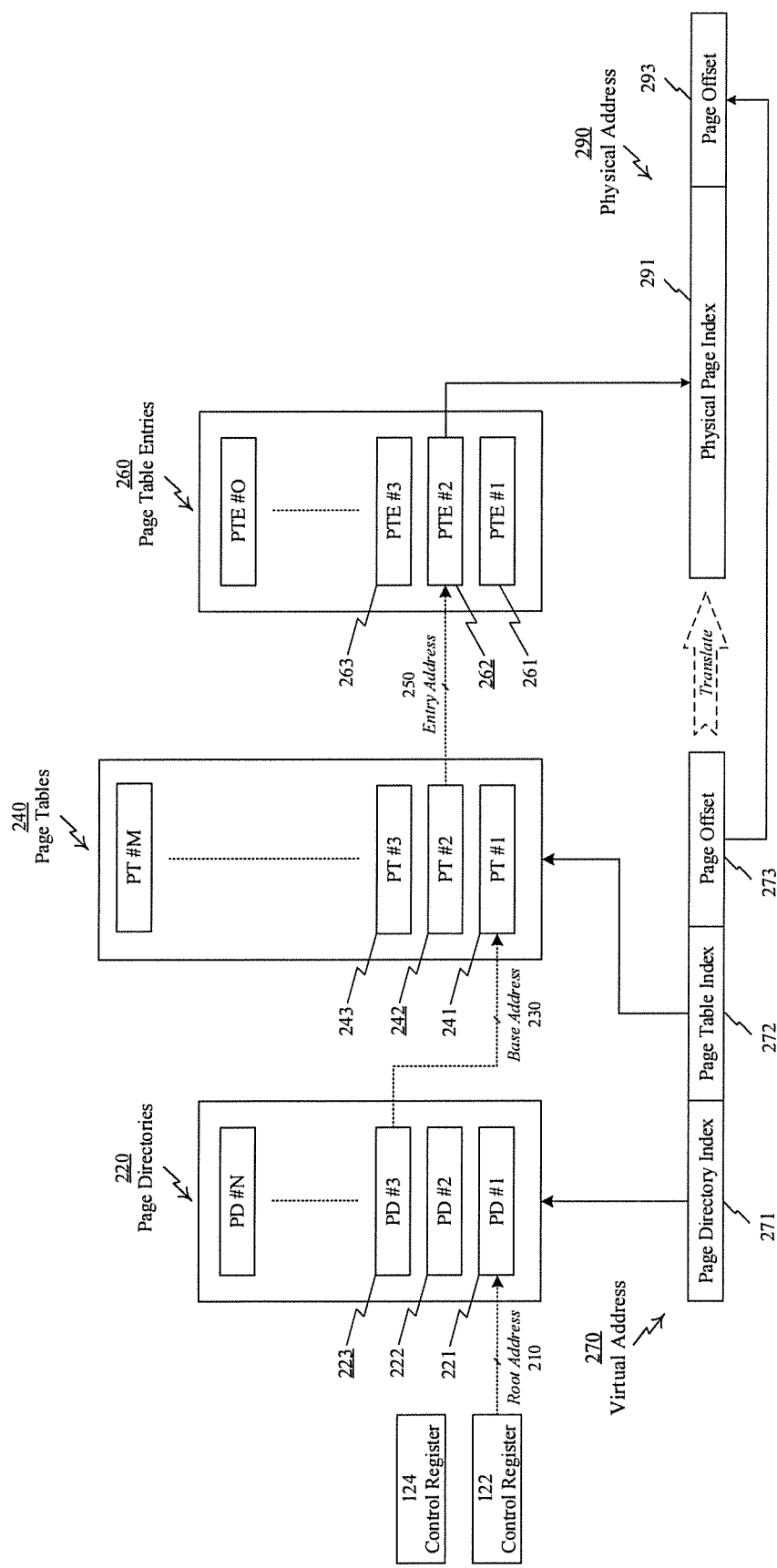
FIG. 2A is a schematic diagram of an exemplary method for memory management of a kernel space, according to some embodiments of the present disclosure.

Processor 120 can include a microprocessor, digital signal processor, controller, or microcontroller. Processor 120 may be configured to manage a kernel space and a user space for an OS kernel and a user process, respectively. Processor 120 may include a control register 122 and a control register 124, as shown in FIG. 1. Processor 120 can be configured to store a root page table index corresponding to a kernel space in control register 122. The root page table index corresponding to the kernel space may be used for an OS kernel to translate a virtual address to a physical address as illustrated in FIG. 2A and further described below.

Figure 3A:
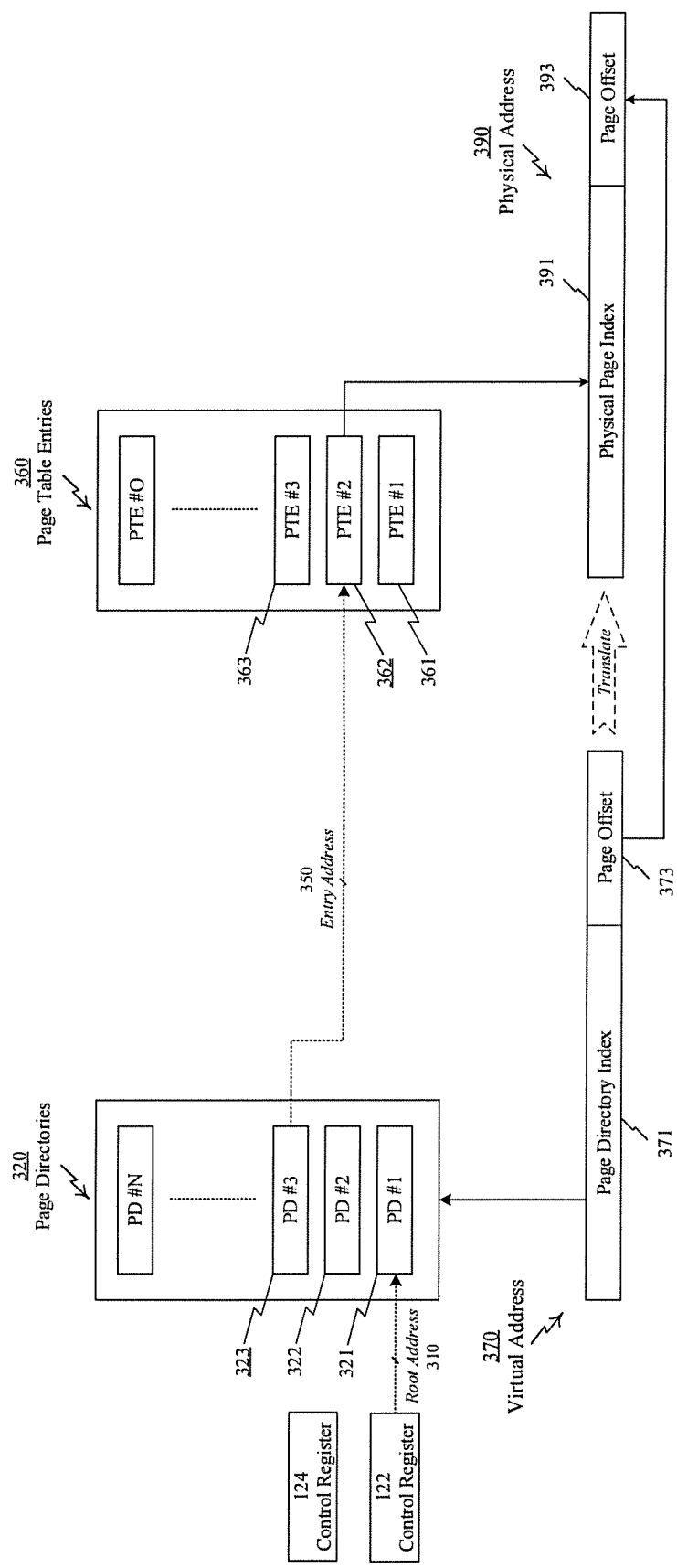
FIG. 3A is a schematic diagram of an exemplary method for memory management of a kernel space, according to some embodiments of the present disclosure.

Processor 120 may also be configured to store another root page table index corresponding to a user space in control register 124. The root page table index corresponding to the user space may be used for a user process to translate a virtual address to a physical address as illustrated in FIG. 3A and described below. Each user process may have its root page table index corresponding to the user space. Processor 120 may be configured to update control register 124 with another root page table index whenever processor 120 may be configured to execute another user process.

As noted above, control register 122 and control register 124 can be configured to be storing units to store root page table indexes of an OS kernel and a user process. When there is a translation of a virtual address to a physical address for an OS kernel, control register 122 may be configured as the storing unit to store the root page table index of the OS kernel. On the other hand, whenever there is a translation of a virtual address to a physical address for a user process, control register 124 may be configured as the storing unit to store the root page table index of the user process. In some embodiments, control register 122 may not be configured to store a root page table index of a user process. In some embodiments, control register 124 may not be configured to store a root page table index of an OS kernel.

For example, an emerging processor according to the present disclosure may include a control register 3 for an OS kernel (CR3K) and another control register 3 for a user process (CR3U) to store root page table indices of the OS kernel and the user process, respectively. CR3K and CR3U are two separate registers. When the kernel OS boots up, the CPU may initially operate in a paging-disabled mode before enabling virtual-to-physical mapping for the kernel OS. Because the kernel space can be mapped to the entire space of the physical memory, the OS kernel may set up a one-to-one mapping from the kernel space to the physical memory of the system. For example, in a 64-bit system with a 32-GB physical memory, the OS kernel may map the first 32 GB of its virtual address space to the 32-GB physical memory. After the initialization, the OS kernel writes the root page table index of the OS kernel into CR3K, and switches the CPU into a paging-enabled mode. The OS kernel starts to operate with virtual-to-physical address mapping.

The OS kernel is also responsible for managing and setting up page tables for each user process. When a user process is launched, the OS kernel sets up page directories, page tables, and page table entries for the user process. Because the user space can also be mapped to the entire space of the physical memory, the user process can have flexible and efficient virtual-to-physical address mapping. After the initialization for the user process, the OS kernel writes the root page table index of the user process into the CR3U, and also stores it in the process's task space. When a context switch occurs in the OS kernel's scheduler, another user process needs to replace the current user process. The CPU may read the root page table index of the another user process and writes it to the CR3U. The CPU then switches to execute the another user process In some embodiments, an x86 CPU may be configured to store a root page table index of the OS kernel in its control register 3 (CR3). The x86 CPU may also be configured to store a root page table index of a user process in its control register 4 (CR4).

Alternatively, two storing units (not shown) in computer system 100, but outside of processor 120, can be configured to store root page table indices of an OS kernel and a user process for translating virtual addresses to physical addresses for the OS kernel and the user process, respectively. For example, two 32-bit spaces of a cache may be configured to be the two storing units to store root page table indices of a Linux kernel and a user process. As another example, two 32-bit spaces of memory 110 may be configured to be the storing units to store root page table indices of a Linux kernel and a user process. In some embodiments, one of two storing units (not shown) in computer system 100, but outside of processor 120, may be configured to store a root page table index of an OS kernel or a user process for translating virtual addresses to physical addresses for the OS kernel or the user process. The other storing unit may be a control register in processor 120. For example, control register 122 may be configured to store a root page table index of a Linux kernel while a 32-bit space of memory 110 may be configured to store a root page table index of a user process.

Processor 120 may include a memory management unit to perform memory management throughout the present disclosure for the OS kernel and/or the user process.

Storage 130 may include any appropriate type of mass storage provided to store any type of information that processor 120 may need to operate. Storage 130 may be a volatile or non-volatile, magnetic, semiconductor, tape, optical, removable, non-removable, or other type of storage device or tangible and/or non-transitory computer-readable medium. Storage 130 may be configured to store one or more computer programs that may be executed by processor 120 to perform exemplary memory management methods disclosed in this application. For example, storage 130 may be configured to store program(s) that may be executed by processor 120 to translate virtual addresses to physical addresses for the OS kernel and the user process, as described above.

Storage 130 may further be configured to store information and data used by processor 120. For example, storage 130 may be configured to store data that memory 110 may not be able to store. When memory 110 may be full, some data in memory 110 may be swapped out to storage 130.

I/O interface 140 may be configured to facilitate the communication between computer system 100 and other apparatuses. For example, I/O interface 140 may be configured to receive data or instructions from another apparatus, e.g., another computer. I/O interface 140 may also be configured to output data or instructions to other apparatuses, e.g., a laptop computer or a speaker.

Processor 120 may be configured to respectively assign an OS kernel and a user process dedicated registers CR3K and CR3U to store their root page table indices for memory management of kernel and user spaces. Processor 120 may also be configured to respectively build up and retrieve page directories, page tables, and page table entries for the OS kernel and the user process. With the dedicated CR3K and CR3U, and respective page tables, processor 120 may be configured to map the kernel space and the user space to an entire physical memory space. For example, processor 120 may be configured to map both the kernel space and the user space to the entire physical memory space of 4 GB in a 32-bit system. In other words, both the kernel space and the user space are 4-GB spaces. Alternatively, processor 120 may be configured to map the kernel space and the user space to a part of the entire physical memory space. For example, processor 120 may be configured to map the kernel space and the user space of 32 GB corresponding to a part of an entire physical memory space of 16 exabytes (EB) (i.e. $16 \times 10^9$ GB) in a 64-bit computer system.

Processor 120 may be configured to obtain a virtual address from an OS kernel or a user process for virtual-to-physical address mapping. After obtaining a virtual address from an OS kernel, processor 120 may be configured to determine to access the kernel space as a default result. After obtaining a virtual address from a user process, processor 120 may be configured to determine to access the user space as a default result. In some embodiments, processor 120 may be configured to obtain an access-user-space indication for the OS kernel. After obtaining the access-user-space indication from the OS kernel, processor 120 may be configured to determine to access the user space.

Figure 2B:
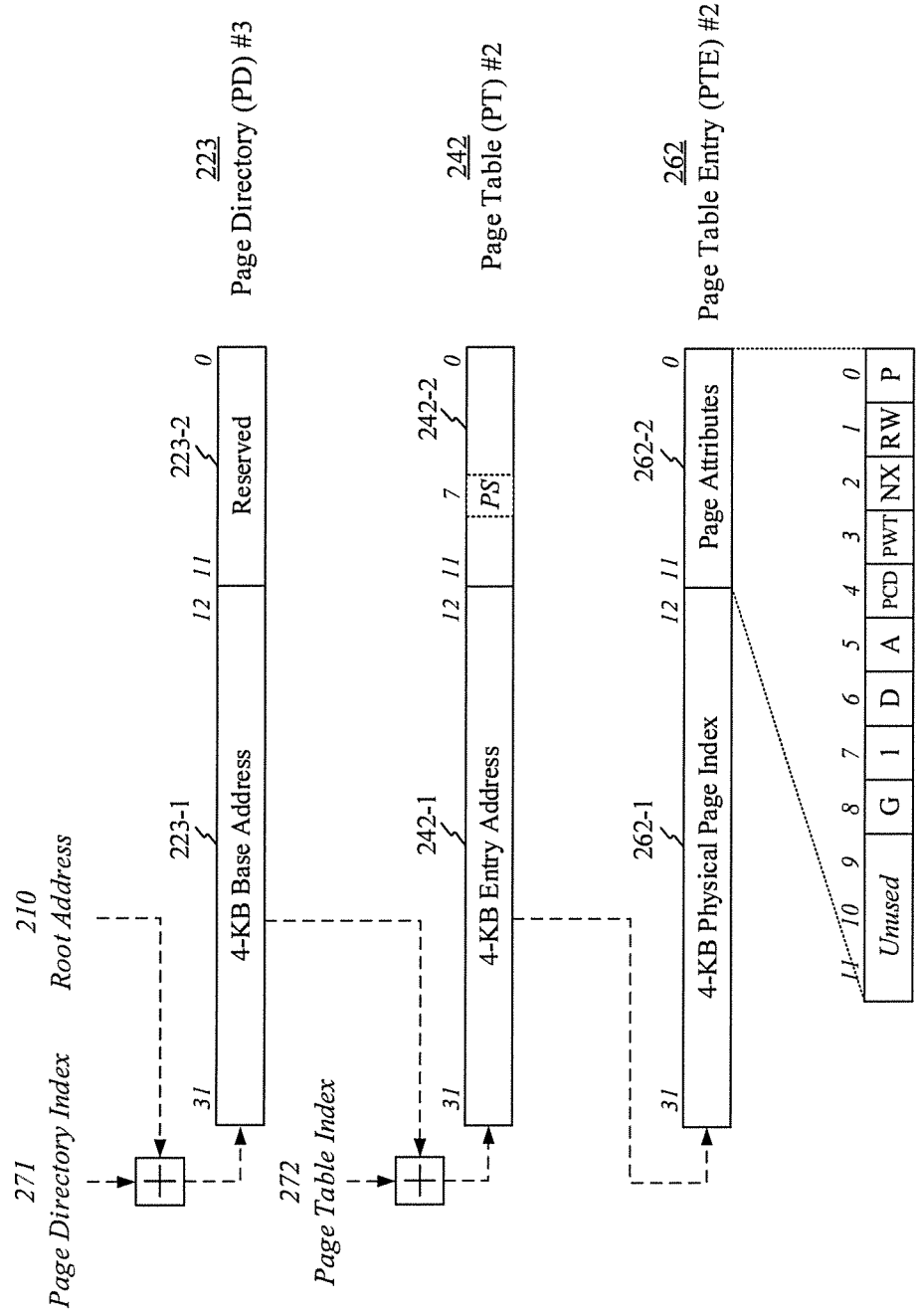
FIG. 2B is a schematic diagram of an exemplary page mapping for the kernel space, according to some embodiments of the present disclosure.

FIGS. 2A and 2B are a schematic diagram of an exemplary method for memory management of a kernel space and an exemplary corresponding page mapping, according to some embodiments of the present disclosure. A virtual address for an OS kernel may include a page directory index, a page table index, and a page offset. For example, as illustrated in FIG. 2A, a virtual address 270 for a 32-bit OS kernel may include a page directory index 271, a page table index 272 and a page offset 273.

Page directory index 271 may be an index of page directories, and may be used with a root address to point to a page directory that may include a base address of page tables. In FIG. 2A, control register 122 may store, for example, a root page table index for an OS kernel as a root address 210. Page directory index 271 may be used with root address 210 to point to a page directory (PD) 223 that includes a base address 230 of page tables 240.

Page table index 272 may be an index of page tables, and may be used with a base address 230 to point to a page table (PT) that may include an entry address of page table entries. For example, page table index 272 may be used with base address 230 to point to a page table 242 that may include an entry address 250 of page table entries 260, as illustrated in FIG. 2A.

Page offset 273 may be an offset of pages, and may be used as a page offset in a translated physical address. For example, page offset 273 of virtual address 270 may be used as a page offset 293 of a physical address 290 directly, as illustrated in FIG. 2A.

To translate a virtual address to a physical address for an OS kernel, processor 120 may be configured to store a root page table index of an OS kernel in a storing unit. For example, processor 120 may be configured to store a root page table index for a Linux kernel in control register 122. Processor 120 may be configured to use the stored root page table index as root address 210 pointing to a position, e.g., page directory 221, in page directories 220, as shown in FIG. 2A. Processor 120 may also be configured to combine the root page table index stored in control register 122 with page directory index 271 to find a page directory that may include a base address of page tables. For example, processor 120 may be configured to combine root address 210 with page directory index 271 of virtual address 270 to find page directory 223, as shown in FIG. 2B. In other words, processor 120 is configured to use page directory 221 as a starting position in page directories 220, and use page directory index 271 as an offset to find page directory 223, as shown in FIGS. 2A and 2B.

Page directory 223 may include a base address pointing to a base address of page tables, the next level in the three-level page table structure. As shown in FIG. 2B, page directory 223 includes a 4-KB base address 223-1 that points to a page table in the next level of the three-level page tables. Processor 120 may further be configured to read the contents of page directory 223 to obtain base address 230 pointing to page table 241 in page tables 240, as shown in FIG. 2A.

Processor 120 may also be configured to combine a base address stored in found page directory 223 with page table index 272 to find a page table that includes an entry address of page table entries. For example, processor 120 may be configured to combine base address 230 (i.e. 4-KB base address 223-1) with page table index 272 of virtual address 270 to find page table 242, as shown in FIG. 2B. In other words, processor 120 is configured to use page table 241 as a starting position in page tables 240, and use page table index 272 as an offset to find page table 242, as shown in FIGS. 2A and 2B.

Page table 242 may include an entry address pointing to a position among page table entries, the next level in the three-level page table structure. As shown in FIG. 2B, page table 242 includes a 4-KB entry address 242-1 pointing to a page table entry in the next level of the three-level page tables. Processor 120 may be configured to read the contents of page table 242 to obtain entry address 250 pointing to page table entry 262 in page table entries 260, as shown in FIG. 2A.

Processor 120 may further be configured to read contents of page table entry 262 to obtain a physical page index. As shown in FIG. 2B, page table entry 262 includes a 4-KB physical page index 262-1 and a page attributes 262-2. According to entry address 250, processor 120 may be configured to read 4-KB physical page index 262-1 of page table entry 262 to be physical page index 291, as shown in FIGS. 2A and 2B.

Processor 120 may further be configured to combine the physical page index and the page offset to be the physical address for the OS kernel. For example, processor 120 may be configured to combine obtained physical page index 291 (i.e., 4-KB physical page index 262-1) and page offset 293 (i.e., page offset 273) to be physical address 290 for the OS kernel. Accordingly, processor 120 may be configured to access memory 110 at translated physical address 290 to obtain required data or instructions for the OS kernel.

In some embodiments, processor 120 may be configured to obtain a page-size indicator indicating a page size of the kernel space, or a kernel-space page size. As shown in FIG. 2B, page table entry 262 includes page attributes 262-2. Processor 120 may be configured to read page attributes 262-2 in page table entry 262. Page attributes 262-2 may include a bit, e.g., bit-7, indicating a page size of the kernel space. For example, if the bit-7 of page attributes 262-2 is "1," the page size of the kernel space may be 4 KB. If the bit-7 of page attributes 262-2 is "0," the page size of the kernel space may be 4 megabytes (MB).

When the page-size indicator indicates that the kernel space includes a first page size, processor 120 can be configured to translate the virtual address to the physical address as described above. For example, when the bit-7 of page attributes 262-2 is "1" indicating a 4-KB page size of the kernel space, processor 120 may be configured to translate virtual address 270 to physical address 290 as described above and shown in FIGS. 2A and 2B. When the bit-7 of page attributes 262-2 is "0" indicating a 4-MB page size of the kernel space, processor 120 may be configured to translate a virtual address 370 to a physical address 390 as described below and shown in FIGS. 3A and 3B.

The bit indicating the page size of the kernel space can also be included in one of page directories or page tables. For example, a page-size bit may be included in a reserved field 223-2 of page directory 223 or a reserved field 242-2 of page table 242 in FIG. 2B. For example, bit-7 of reserved field 242-2 may be used as the page-size bit. Processor 120 may be configured to read the bit-7 of reserved field 242-2 and obtain the page size of the kernel space accordingly.

Referring to FIG. 2B, page table entry 262 includes physical page index 262-1 and page attributes 262-2. Processor 120 may be configured to use physical page index 262-1 for translating the virtual address into the physical address as described above. Physical page index 262-1 may include, for example, the most significant bit (MSB) 20 bits of page table entry 262 for addressing 4-KB pages in the kernel space of a 32-bit computer system.

Page attributes 262-2 may include, for example, the least significant bit (LSB) 12 bits of page table entry 262 in the 32-bit computer system. These 12 bits of page attributes 262-2 may be configured to indicate attributes of the page at the translated physical address. For example, a bit-7 of page attributes 262-2 may be configured to indicate a page size of the kernel space. For example, as described above, if the bit-7 of page attributes 262-2 is "1," the page size of the kernel space may be configured to be 4 KB. If the bit-7 of page attributes 262-2 is "0," the page size of the kernel space may be configured to be 4 MB. Processor 120 may be configured to translate the virtual address to the physical address in accordance with the bit-7 of page attributes 262-2 as described above.

When more than two kinds of page sizes are needed, page attributes 262-2 may include two bits, e.g., bit-9 and bit-7, indicating a page size of the kernel space. The bit-9 of page attributes 262-2 may further be configured for such usage although it is shown as unused in the figure. For example, if the bit-9 and bit-7 of page attributes 262-2 are "11," the page size of the kernel space may be 4 KB. If the bit-9 and bit-7 of page attributes 262-2 are "10," the page size of the kernel space may be 4 MB. If the bit-9 and bit-7 of page attributes 262-2 are "01," the page size of the kernel space may be 16 MB. If the bit-9 and bit-7 of page attributes 262-2 are "00," the page size of the kernel space may be 64 MB. Processor 120 may be configured to translate the virtual address to the physical address in accordance with the bit-9 and bit-7 of page attributes 262-2 similar to those described above.

Moreover, page attributes 262-2 may include an NX indicator, e.g., bit-2, indicating a page at the translated physical address is not executable. For example, if the bit-2 of page attributes 262-2 is "1," the page at translated physical address 290 may not be executable. Processor 120 may be configured not to execute or access the page at translated physical address 290 in accordance with the bit-2 of page attributes 262-2 as described above.

The bit indicating the page size of the kernel space can also be included in one of page directories or page tables. For example, a page-size bit may be included in a reserved field 223-2 of page directory 223 or a reserved field 242-2 of page table 242 in FIG. 2B. For example, bit-7 of reserved field 242-2 may be used as the page-size bit. Processor 120 may be configured to read the bit-7 of reserved field 242-2 and obtain the page size of the kernel space accordingly.

Similar to the bit indicating the page size, the NX indicator can also be included in one of page directories or page tables. For example, an NX bit may be included in a reserved field 223-2 of page directory 223 or a reserved field 242-2 of page table 242 in FIG. 2B. Processor 120 may be configured to read the NX bit for the page at the translated physical address accordingly.

In some embodiments, processor 120 may be configured to translate a virtual address to a physical address directly. In other words, the virtual address is identical to the physical address. For example, virtual address 270 in FIG. 2A may be translated to be physical address 290 directly without being translated through page directories 220, page tables 240, and page table entries 260 as shown in the figure. The direct translation from the virtual address to the physical address may be helpful for the OS kernel to access memory 110 quickly and efficiently.

Figure 3B:
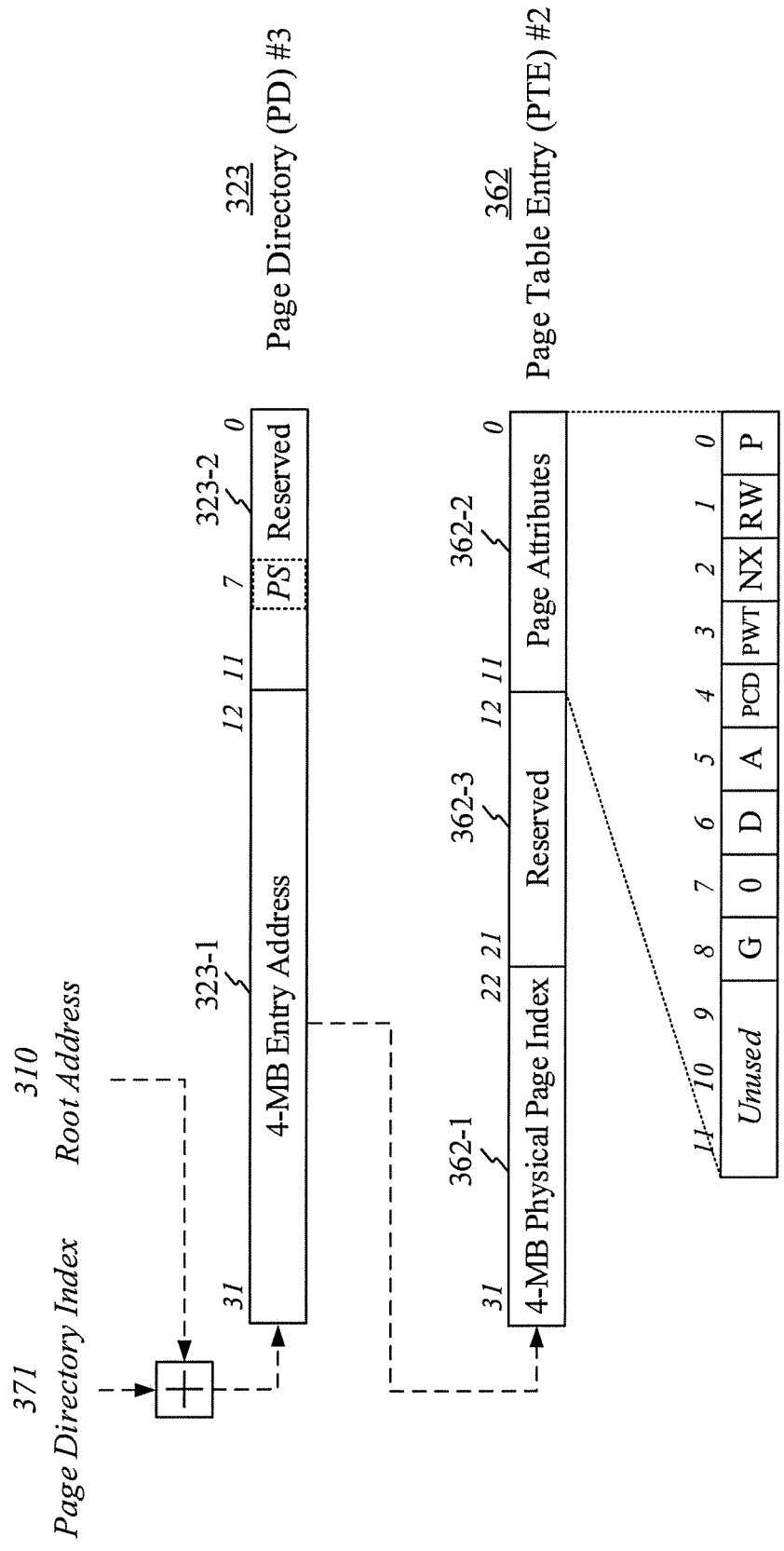
FIG. 3B is a schematic diagram of an exemplary page mapping for the kernel space, according to some embodiments of the present disclosure.

When the page-size indicator indicates that the kernel space includes a second page size, processor 120 may be configured to translate the virtual address to the physical address as illustrated in FIGS. 3A and 3B. For example, when the bit-7 of page attributes 362-2 in FIG. 3B is "0" indicating a 4-MB page size of the kernel space, processor 120 may be configured to translate a virtual address 370 to a physical address 390 through a two-level page tables, including page directories 320 and page table entries 360, as shown in FIG. 3A.

FIGS. 3A and 3B are a schematic diagram of an exemplary method for memory management of a kernel space and an exemplary corresponding page mapping, according to some embodiments of the present disclosure. A virtual address for an OS kernel may include a page directory index and a page offset. For example, as illustrated in FIG. 3A, virtual address 370 for a 32-bit OS kernel may include a page directory index 371 and a page offset 373.

Page directory index 371 may be an index of page directories, and may be used with a root address to point to a page directory that may include an entry address of page table entry. In FIG. 3A, control register 122 may be configured to store, for example, a root page table index for an OS kernel as a root address 310. Page directory index 371 may be used with root address 310 to point to a page directory (PD) 323 that includes an entry address 350 of page table entries 360.

Page offset 373 may be an offset of pages, and may be used as a page offset in a translated physical address. For example, page offset 373 of virtual address 370 may be used as a page offset 393 of a physical address 390 directly, as illustrated in FIG. 3A.

To translate a virtual address to a physical address for an OS kernel, processor 120 may be configured to store a root page table index of an OS kernel in a storing unit. For example, processor 120 may be configured to store a root page table index for a Linux kernel in control register 122 in FIG. 3A. Processor 120 may be configured to use the stored root page table index as root address 310 pointing to a position, e.g., page directory 321, in page directories 320; as shown in FIG. 3A. Processor 120 may also be configured to combine the root page table index stored in control register 122 with page directory index 371 to find a page directory that includes an entry address of page tables. For example, processor 120 may be configured to combine root address 310 with page directory index 371 of virtual address 370 to find page directory 323, as shown in FIG. 3B. In other words, processor 120 is configured to use page directory 321 as a starting position in page directories 320, and use page directory index 371 as an offset to find page directory 323, as shown in FIGS. 3A and 3B.

Page directory 323 may include an entry address pointing to a position among page table entries, the next level in the two-level page table structure. As shown in FIG. 3B, page directory 323 includes a 4-MB entry address 323-1 that points to a page table entry in the next level of the two-level page tables. Processor 120 may be configured to read the contents of page directory 323 to obtain entry address 350 pointing to page table entry 362 in page table entries 360, as shown in FIG. 3A.

Processor 120 may also be configured to read contents of page table entry 362 to obtain a physical page index. As shown in FIG. 3B, page table entry 362 includes a 4-MB physical page index 362-1, a page attributes 362-2, and a reserved field 362-3. According to entry address 350, processor 120 may be configured to read 4-MB physical page index 362-1 of page table entry 362 to be physical page index 391, as shown in FIGS. 3A and 3B.

Processor 120 may further be configured to combine the physical page index and the page offset to be the physical address for the OS kernel. For example, processor 120 may be configured to combine obtained physical page index 391 (i.e., 4-MB physical page index 362-1) and page offset 393 (i.e., page offset 373) to be physical address 390 for the OS kernel. Accordingly, processor 120 may be configured to access memory 110 at translated physical address 390 to obtain required data or instructions for the OS kernel.

Referring to FIG. 3B, page table entry 362 includes physical page index 362-1 and page attributes 362-2. Processor 120 may be configured to use physical page index 362-1 for translating the virtual address into the physical address as described above. Physical page index 362-1 may include, for example, the most significant bit (MSB) 10 bits of page table entry 362 for addressing 4-MB pages in the kernel space of a 32-bit computer system.

Page attributes 362-2 may include, for example, the least significant bit (LSB) 12 bits of page table entry 362 in the 32-bit computer system. These 12 bits of page attributes 362-2 may be configured to indicate attributes of the page at the translated physical address. For example, a bit-7 of page attributes 362-2 may be configured to indicate a page size of the kernel space. For example, as described above, if the bit-7 of page attributes 362-2 is "0," the page size of the kernel space may be configured to be 4 MB. If the bit-7 of page attributes 362-2 is "0," the page size of the kernel space may be configured to be 4 KB. Processor 120 may be configured to translate the virtual address to the physical address in accordance with the bit-7 of page attributes 362-2 as described above.

When more than two kinds of page sizes are needed, page attributes 362-2 may include two bits, e.g., bit-9 and bit-7, indicating a page size of the kernel space. The bit-9 of page attributes 362-2 may further be configured for such usage although it is shown as unused in the figure. For example, if the bit-9 and bit-7 of page attributes 362-2 are "11," the page size of the kernel space may be 4 KB. If the bit-9 and bit-7 of page attributes 362-2 are "10," the page size of the kernel space may be 4 MB. If the bit-9 and bit-7 of page attributes 362-2 are "01," the page size of the kernel space may be 16 MB. If the bit-9 and bit-7 of page attributes 362-2 are "00," the page size of the kernel space may be 64 MB. Processor 120 may be configured to translate the virtual address to the physical address in accordance with the bit-9 and bit-7 of page attributes 362-2 similar to those described above.

Moreover, page attributes 362-2 may include an NX indicator, e.g., bit-2, indicating a page at the translated physical address is not executable. For example, if the bit-2 of page attributes 362-2 is "1," the page at translated physical address 390 may not be executable. Processor 120 may be configured not to execute or access the page at translated physical address 390 in accordance with the bit-2 of page attributes 362-2 as described above.

Alternatively, the bit indicating the page size of the kernel space can also be included in one of page directories or page table entries. For example, a page-size bit may be included in a reserved field 323-2 of page directory 323 or a reserved field 362-2 of page table entry 362 in FIG. 3B. For example, bit-7 of reserved field 323-2 may be used as the page-size bit. Processor 120 may be configured to read the bit-7 of reserved field 323-2 and obtain the page size of the kernel space accordingly.

Similar to the bit indicating the page size, the NX indicator can also be included in one of page directories or page table entries. For example, an NX bit may be included in reserved field 323-2 of page directory 323 or reserved field 362-2 of page table entry 362 in FIG. 3B. Processor 120 may be configured to read the NX bit for the page at the translated physical address accordingly. The non-executable indicator may be helpful to prevent the OS kernel from executing any malicious code or virus in the page at the translated physical address.

In some embodiments, processor 120 may be configured to translate a virtual address to a physical address directly. In other words, the virtual address is identical to the physical address. For example, virtual address 370 in FIG. 3A may be translated to be physical address 390 directly without being translated through page directories 320 and page table entries 360 as shown in the figure. The direct translation from the virtual address to the physical address may be helpful for the OS kernel to access memory 110 quickly and efficiently.

For a user process, processor 120 may be configured to translate a virtual address to a physical address in accordance with the root page table index stored in control register 124. For example, processor 120 may be configured to translate a 32-bit virtual address into a 32-bit physical address of memory 110 for an application program in accordance with the stored root page table index in control register 124.

Figure 4A:
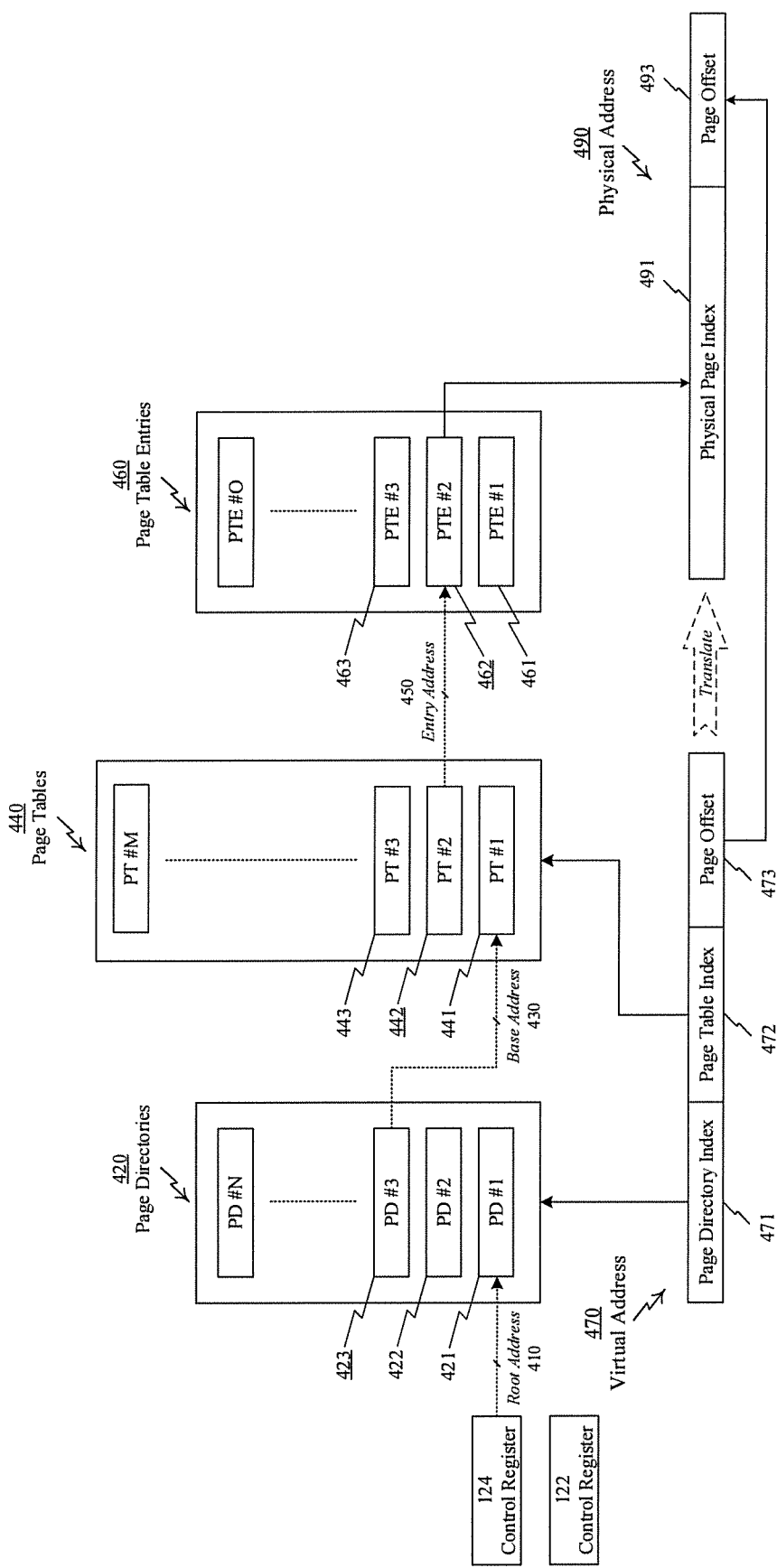
FIG. 4A is a schematic diagram of an exemplary method for memory management of a user space, according to some embodiments of the present disclosure.
Figure 4B:
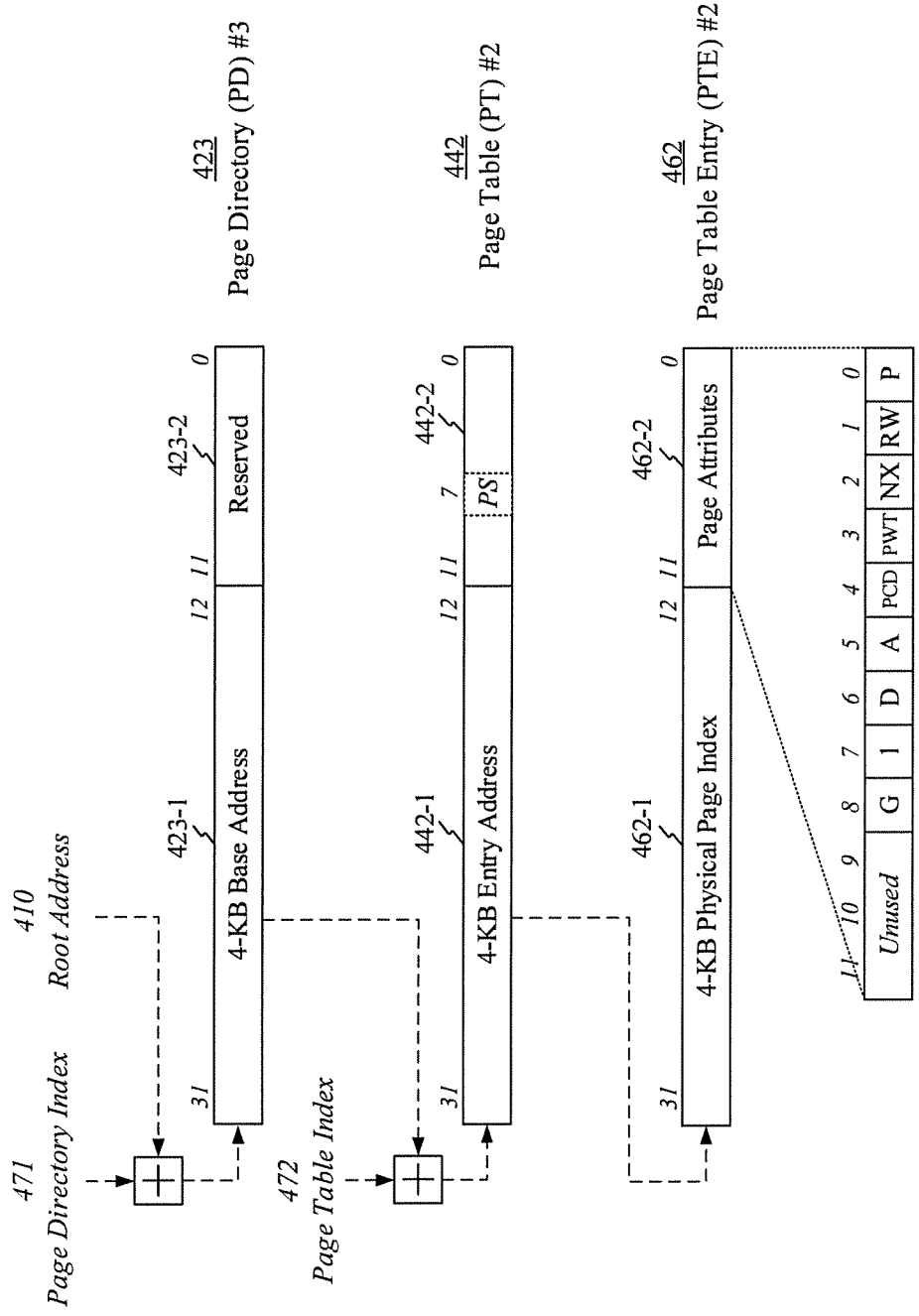
FIG. 4B is a schematic diagram of an exemplary page mapping for the user space, according to some embodiments of the present disclosure.

FIGS. 4A and 4B are a schematic diagram of an exemplary method for memory management of a user space and an exemplary corresponding page mapping, according to some embodiments of the present disclosure. A virtual address for a user process may include a page directory index, a page table index, and a page offset. For example, as illustrated in FIG. 4A, a virtual address 470 for a 32-bit user process may include a page directory index 471, a page table index 472 and a page offset 473.

Page directory index 471 may be an index of page directories, and may be used with a root address to point to a page directory that may include a base address of page tables. In FIG. 4A, control register 124 may store, for example, a root page table index for a user process as a root address 410. Page directory index 471 may be used with root address 410 to point to a page directory (PD) 423 that includes a base address 430 of page tables 440.

Page table index 472 may be an index of page tables, and may be used with a base address 430 to point to a page table (PT) that may include an entry address of page table entries. For example, page table index 472 may be used with base address 430 to point to a page table 442 that may include an entry address 450 of page table entries 460, as illustrated in FIG. 4A.

Page offset 473 may be an offset of pages, and may be used as a page offset in a translated physical address. For example, page offset 473 of virtual address 470 may be used as a page offset 493 of a physical address 490 directly, as illustrated in FIG. 4A.

To translate a virtual address to a physical address for a user process, processor 120 may be configured to store a root page table index of the user process in a storing unit. For example, processor 120 may be configured to store a root page table index for a Linux kernel in control register 124. Processor 120 may be configured to use the stored root page table index as root address 410 pointing to a position, e.g., page directory 421, in page directories 420, as shown in FIG. 4A. Processor 120 may also be configured to combine the root page table index stored in control register 124 with page directory index 471 to find a page directory that may include a base address of page tables. For example, processor 120 may be configured to combine root address 410 with page directory index 471 of virtual address 470 to find page directory 423, as shown in FIG. 4B. In other words, processor 120 is configured to use page directory 421 as a starting position in page directories 420, and use page directory index 471 as an offset to find page directory 423, as shown in FIGS. 4A and 4B.

Page directory 423 may include a base address pointing to a base address of page tables, the next level in the three-level page table structure. As shown in FIG. 4B, page directory 423 includes a 4-KB base address 423-1 that points to a page table in the next level of the three-level page tables. Processor 120 may further be configured to read the contents of page directory 423 to obtain base address 430 pointing to page table 441 in page tables 440, as shown in FIG. 4A.

Processor 120 may also be configured to combine a base address stored in found page directory 423 with page table index 472 to find a page table that includes an entry address of page table entries. For example, processor 120 may be configured to combine base address 430 (i.e. 4-KB base address 423-1) with page table index 472 of virtual address 470 to find page table 442, as shown in FIG. 4B. In other words, processor 120 is configured to use page table 441 as a starting position in page tables 440, and use page table index 472 as an offset to find page table 442, as shown in FIGS. 4A and 4B.

Page table 442 may include an entry address pointing to a position among page table entries, the next level in the three-level page table structure. As shown in FIG. 4B, page table 442 includes a 4-KB entry address 442-1 pointing to a page table entry in the next level of the three-level page tables. Processor 120 may be configured to read the contents of page table 442 to obtain entry address 450 pointing to page table entry 462 in page table entries 460, as shown in FIG. 4A.

Processor 120 may further be configured to read contents of page table entry 462 to obtain a physical page index. As shown in FIG. 4B, page table entry 462 includes a 4-KB physical page index 462-1 and a page attributes 462-2. According to entry address 450, processor 120 may be configured to read 4-KB physical page index 462-1 of page table entry 462 to be physical page index 491, as shown in FIGS. 4A and 4B.

Processor 120 may further be configured to combine the physical page index and the page offset to be the physical address for the user process. For example, processor 120 may be configured to combine obtained physical page index 491 (i.e., 4-KB physical page index 462-1) and page offset 493 (i.e., page offset 473) to be physical address 490 for the user process. Accordingly, processor 120 may be configured to access memory 110 at translated physical address 490 to obtain required data or instructions for the user process.

In some embodiments, processor 120 may be configured to obtain a page-size indicator indicating a page size of the user space, or a user-space page size. As shown in FIG. 4B, page table entry 462 includes page attributes 462-2. Processor 120 may be configured to read page attributes 462-2 in page table entry 462. Page attributes 462-2 may include a bit, e.g., bit-7, indicating a page size of the user space. For example, if the bit-7 of page attributes 462-2 is "1," the page size of the user space may be 4 KB. If the bit-7 of page attributes 462-2 is "0," the page size of the user space may be 4 MB.

When the page-size indicator indicates that the user space includes a first page size, processor 120 can be configured to translate the virtual address to the physical address as described above. For example, when the bit-7 of page attributes 462-2 is "1" indicating a 4-KB page size of the user space, processor 120 may be configured to translate virtual address 470 to physical address 490 as described above and shown in FIGS. 4A and 4B. When the bit-7 of page attributes 462-2 is "0" indicating a 4-MB page size of the user space, processor 120 may be configured to translate a virtual address 570 to a physical address 590 as described below and shown in FIGS. 5A and 5B.

The bit indicating the page size of the kernel space can also be included in one of page directories or page tables. For example, a page-size bit may be included in a reserved field 423-2 of page directory 423 or a reserved field 442-2 of page table 442 in FIG. 4B. For example, bit-7 of reserved field 442-2 may be used as the page-size bit. Processor 120 may be configured to read the bit-7 of reserved field 442-2 and obtain the page size of the user space accordingly.

Referring to FIG. 4B, page table entry 462 includes physical page index 462-1 and page attributes 462-2. Processor 120 may be configured to use physical page index 462-1 for translating the virtual address into the physical address as described above. Physical page index 462-1 may include, for example, the most significant bit (MSB) 20 bits of page table entry 462 for addressing 4-KB pages in the user space of a 32-bit computer system.

Page attributes 462-2 may include, for example, the least significant bit (LSB) 12 bits of page table entry 462 in the 32-bit computer system. These 12 bits of page attributes 462-2 may be configured to indicate attributes of the page at the translated physical address. For example, a bit-7 of page attributes 462-2 may be configured to indicate a page size of the user space. For example, as described above, if the bit-7 of page attributes 462-2 is "1," the page size of the user space may be configured to be 4 KB. If the bit-7 of page attributes 462-2 is "0," the page size of the user space may be configured to be 4 MB. Processor 120 may be configured to translate the virtual address to the physical address in accordance with the bit-7 of page attributes 462-2 as described above.

When more than two kinds of page sizes are needed, page attributes 462-2 may include two bits, e.g., bit-9 and bit-7, indicating a page size of the user space. The bit-9 of page attributes 462-2 may further be configured for such usage although it is shown as unused in the figure. For example, if the bit-9 and bit-7 of page attributes 462-2 are "11," the page size of the user space may be 4 KB. If the bit-9 and bit-7 of page attributes 462-2 are "10," the page size of the user space may be 4 MB. If the bit-9 and bit-7 of page attributes 462-2 are "01," the page size of the user space may be 16 MB. If the bit-9 and bit-7 of page attributes 462-2 are "00," the page size of the user space may be 64 MB. Processor 120 may be configured to translate the virtual address to the physical address in accordance with the bit-9 and bit-7 of page attributes 462-2 similar to those described above.

Moreover, page attributes 462-2 may include an NX indicator, e.g., bit-2, indicating a page at the translated physical address is not executable. For example, if the bit-2 of page attributes 462-2 is "1," the page at translated physical address 490 may not be executable. Processor 120 may be configured not to execute or access the page at translated physical address 490 in accordance with the bit-2 of page attributes 462-2 as described above.

The bit indicating the page size of the user space can also be included in one of page directories or page tables. For example, a page-size bit may be included in a reserved field 423-2 of page directory 423 or a reserved field 442-2 of page table 442 in FIG. 4B. For example, bit-7 of reserved field 442-2 may be used as the page-size bit. Processor 120 may be configured to read the bit-7 of reserved field 442-2 and obtain the page size of the user space accordingly.

Similar to the bit indicating the page size, the NX indicator can also be included in one of page directories or page tables. For example, an NX bit may be included in a reserved field 423-2 of page directory 423 or a reserved field 442-2 of page table 442 in FIG. 4B. Processor 120 may be configured to read the NX bit for the page from the NX bit for the translated physical address accordingly.

In some embodiments, processor 120 may be configured to translate a virtual address to a physical address directly. In other words, the virtual address is identical to the physical address. For example, virtual address 470 in FIG. 4A may be translated to be physical address 490 directly without being translated through page directories 420, page tables 440, and page table entries 460 as shown in the figure. The direct translation from the virtual address to the physical address may be helpful for the user process to access memory 110 quickly and efficiently.

Figure 5A:
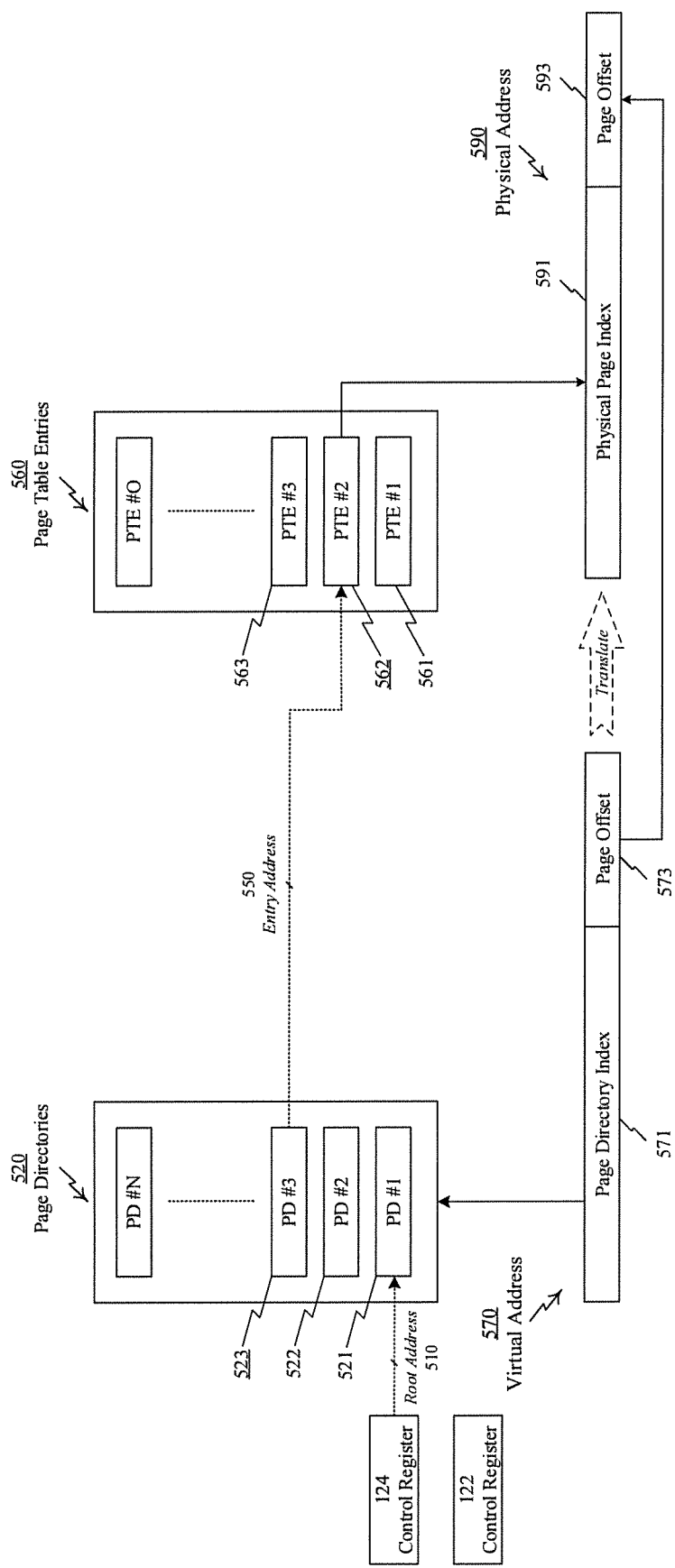
FIG. 5A is a schematic diagram of an exemplary method for memory management of a user space, according to some embodiments of the present disclosure.
Figure 5B:
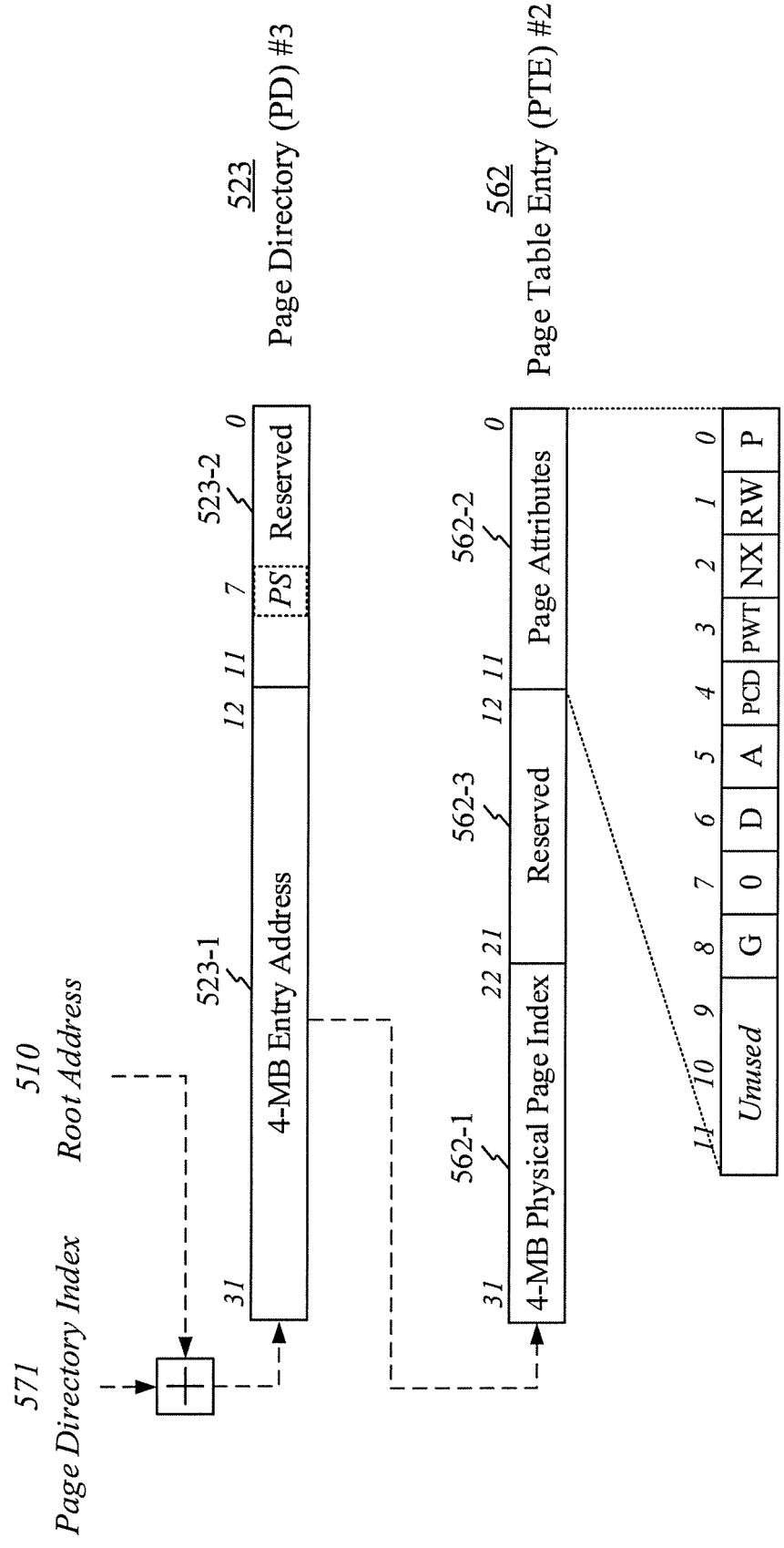
FIG. 5B is a schematic diagram of an exemplary page mapping for the user space, according to some embodiments of the present disclosure.

When the page-size indicator indicates that the user space includes a second page size, processor 120 may be configured to translate the virtual address to the physical address as illustrated in FIGS. 5A and 5B. For example, when the bit-7 of page attributes 562-2 in FIG. 5B is "0" indicating a 4-MB page size of the kernel space, processor 120 may be configured to translate a virtual address 570 to a physical address 590 through a two-level page tables, including page directories 520 and page table entries 560, as shown in FIG. 5A.

FIGS. 5A and 5B are a schematic diagram of an exemplary method for memory management of a user space and an exemplary corresponding page mapping, according to some embodiments of the present disclosure. A virtual address for a user process may include a page directory index and a page offset. For example, as illustrated in FIG. 5A, virtual address 570 for a 32-bit user process may include a page directory index 571 and a page offset 573.

Page directory index 571 may be an index of page directories, and may be used with a root address to point to a page directory that may include an entry address of page table entry. In FIG. 5A, control register 124 may be configured to store, for example, a root page table index for a user process as a root address 510. Page directory index 571 may be used with root address 510 to point to a page directory (PD) 523 that includes an entry address 550 of page table entries 560.

Page offset 573 may be an offset of pages, and may be used as a page offset in a translated physical address. For example, page offset 573 of virtual address 570 may be used as a page offset 593 of a physical address 590 directly, as illustrated in FIG. 5A.

To translate a virtual address to a physical address for a user process, processor 120 may be configured to store a root page table index of the user process in a storing unit. For example, processor 120 may be configured to store a root page table index for a Linux kernel in control register 124 in FIG. 5A. Processor 120 may be configured to use the stored root page table index as root address 510 pointing to a position, e.g., page directory 521, in page directories 520, as shown in FIG. 5A. Processor 120 may also be configured to combine the root page table index stored in control register 124 with page directory index 571 to find a page directory that includes an entry address of page tables. For example, processor 120 may be configured to combine root address 510 with page directory index 571 of virtual address 570 to find page directory 523, as shown in FIG. 5B. In other words, processor 120 is configured to use page directory 521 as a starting position in page directories 520, and use page directory index 571 as an offset to find page directory 523, as shown in FIGS. 5A and 5B.

Page directory 523 may include an entry address pointing to a position among page table entries, the next level in the two-level page table structure. As shown in FIG. 5B, page directory 523 includes a 4-MB entry address 523-1 that points to a page table entry in the next level of the two-level page tables. Processor 120 may be configured to read the contents of page directory 523 to obtain entry address 550 pointing to page table entry 562 in page table entries 560, as shown in FIG. 5A.

Processor 120 may also be configured to read contents of page table entry 562 to obtain a physical page index. As shown in FIG. 5B, page table entry 562 includes a 4-MB physical page index 562-1, a page attributes 562-2, and a reserved field 562-3. According to entry address 550, processor 120 may be configured to read 4-MB physical page index 562-1 of page table entry 562 to be physical page index 591, as shown in FIGS. 5A and 5B.

Processor 120 may further be configured to combine the physical page index and the page offset to be the physical address for the user process. For example, processor 120 may be configured to combine obtained physical page index 591 (i.e., 4-MB physical page index 562-1) and page offset 593 (i.e., page offset 573) to be physical address 590 for the user process. Accordingly, processor 120 may be configured to access memory 110 at translated physical address 590 to obtain required data or instructions for the user process.

Referring to FIG. 5B, page table entry 562 includes physical page index 562-1 and page attributes 562-2. Processor 120 may be configured to use physical page index 562-1 for translating the virtual address into the physical address as described above. Physical page index 562-1 may include, for example, the most significant bit (MSB) 10 bits of page table entry 562 for addressing 4-MB pages in the user space of a 32-bit computer system.

Page attributes 562-2 may include, for example, the least significant bit (LSB) 12 bits of page table entry 562 in the 32-bit computer system. These 12 bits of page attributes 562-2 may be configured to indicate attributes of the page at the translated physical address. For example, a bit-7 of page attributes 562-2 may be configured to indicate a page size of the user space. For example, as described above, if the bit-7 of page attributes 562-2 is "0," the page size of the user space may be configured to be 4 MB. If the bit-7 of page attributes 562-2 is "0," the page size of the user space may be configured to be 4 KB. Processor 120 may be configured to translate the virtual address to the physical address in accordance with the bit-7 of page attributes 562-2 as described above.

When more than two kinds of page sizes are needed, page attributes 562-2 may include two bits, e.g., bit-9 and bit-7, indicating a page size of the user space. The bit-9 of page attributes 562-2 may further be configured for such usage although it is shown as unused in the figure. For example, if the bit-9 and bit-7 of page attributes 562-2 are "11," the page size of the user space may be 4 KB. If the bit-9 and bit-7 of page attributes 562-2 are "10," the page size of the user space may be 4 MB. If the bit-9 and bit-7 of page attributes 562-2 are "01," the page size of the user space may be 16 MB. If the bit-9 and bit-7 of page attributes 562-2 are "00," the page size of the user space may be 64 MB. Processor 120 may be configured to translate the virtual address to the physical address in accordance with the bit-9 and bit-7 of page attributes 562-2 similar to those described above.

Moreover, page attributes 562-2 may include an NX indicator, e.g., bit-2, indicating a page at the translated physical address is not executable. For example, if the bit-2 of page attributes 562-2 is "1," the page at translated physical address 590 may not be executable. Processor 120 may be configured not to execute or access the page at translated physical address 590 in accordance with the bit-2 of page attributes 562-2 as described above.

Alternatively, the bit indicating the page size of the user space can also be included in one of page directories or page table entries. For example, a page-size bit may be included in a reserved field 523-2 of page directory 523 or a reserved field 562-2 of page table entry 562 in FIG. 5B. For example, bit-7 of reserved field 523-2 may be configured as the page-size bit. Processor 120 may be configured to read the bit-7 of reserved field 523-2 and obtain the page size of the user space accordingly.

Similar to the bit indicating the page size, the NX indicator can also be included in one of page directories or page table entries. For example, an NX bit may be included in reserved field 523-2 of page directory 523 or reserved field 562-2 of page table entry 562 in FIG. 5B. Processor 120 may be configured to read the NX indicator of the page at the translated physical address accordingly. The non-executable indicator may be helpful to prevent the OS kernel from executing any malicious code or virus in the page at the translated physical address.

In some embodiments, processor 120 may be configured to translate a virtual address to a physical address directly. In other words, the virtual address is identical to the physical address. For example, virtual address 570 in FIG. 5A may be translated to be physical address 590 directly without being translated through page directories 520 and page table entries 560 as shown in the figure. The direct translation from the virtual address to the physical address may be helpful for the user process to access memory 110 quickly and efficiently.

In some embodiments, processor 120 may be configured to obtain an access-user-space indicator indicating an allowance for the OS kernel to access the user space. For example, processor 120 may include one or more instructions including a prefix "US" used to access the user space in its instruction set. The instruction including the prefix "US" may be used as the access-user-space indicator. When an instruction with the "US" prefix may be executed, processor 120 may be configured as obtaining an access-user-space indication. Referring to FIG. 2A, processor 120 may be configured to access the user space using virtual address 270.

Process 120 may be configured to obtain a base address for the user space in accordance with a root page table index for the user space and a page directory index of the virtual address. For example, referring to FIGS. 2A and 4A, processor 120 may be configured to combine the root page table index stored in control register 124 with page directory index 271 to find a page directory that may include a base address of page tables. Processor 120 may be configured to combine root address 410 with page directory index 271 of virtual address 270 to find page directory 423. In other words, processor 120 is configured to use page directory 421 as a starting position in page directories 420, and use page directory index 271 as an offset to find page directory 423. Processor 120 may further be configured to read the contents of page directory 423 to obtain base address 430 pointing to page table 441 in page tables 440.

Processor 120 may also be configured to combine a base address stored in found page directory 423 with page table index 272 to find a page table that includes an entry address of page table entries. For example, processor 120 may be configured to combine base address 430 (i.e. 4-KB base address 423-1) with page table index 272 of virtual address 270 to find page table 442. In other words, processor 120 is configured to use page table 441 as a starting position in page tables 440, and use page table index 272 as an offset to find page table 442. Processor 120 may further be configured to read the contents of page table 442 to obtain entry address 450 pointing to page table entry 462 in page table entries 460.

Processor 120 may also be configured to read contents of page table entry 462 to obtain a physical page index.

According to entry address 450, processor 120 may be configured to read 4-KB physical page index 462-1 of page table entry 462 to be physical page index 491.

Processor 120 may further be configured to combine the physical page index and the page offset to be the physical address for the user process. For example, processor 120 may be configured to combine obtained physical page index 491 (i.e., 4-KB physical page index 462-1) and page offset 273 to be a physical address for the OS kernel to access the user space. Accordingly, processor 120 may be configured to access memory 110 at the translated physical address to obtain required data or instructions for the OS kernel from the user space.

In some embodiments, processor 120 may be configured to obtain an access-user-space indicator indicating an allowance for the user process to access the user space. For example, processor 120 may include one or more instructions including a prefix "US" used to access the user space in its instruction set. The instruction including the prefix "US" may be used as the access-user-space indicator. When an instruction with the "US" prefix is executed, processor 120 may be configured to set a general protection fault because the instruction with the "US" prefix is reserved for the OS kernel only. For example, processor 120 can set a warning message or flag, and not execute the instruction with the "US" prefix for the user process.

Figure 6:
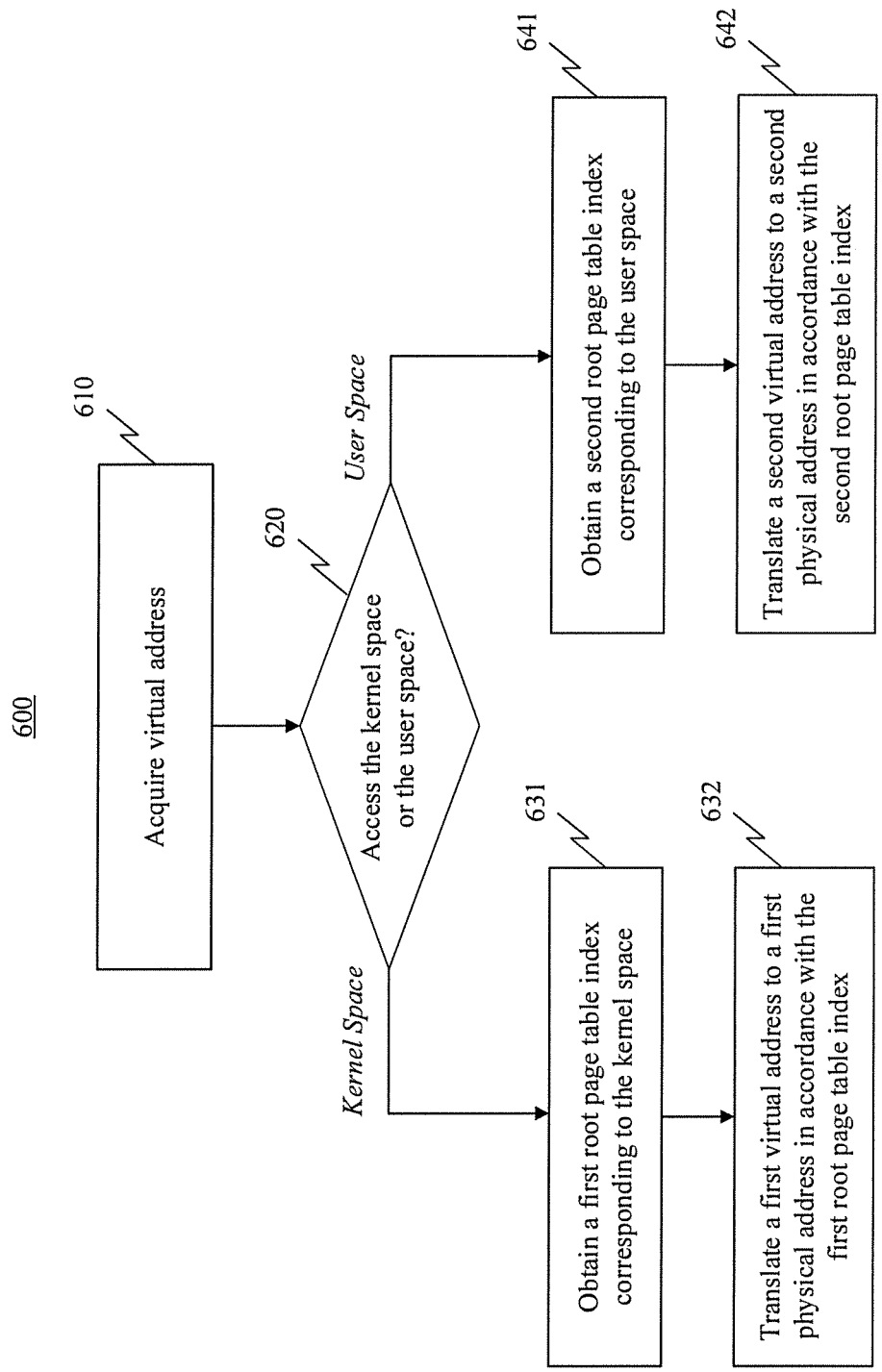
FIG. 6 is a flow chart of an exemplary memory management method, according to some embodiments of the present disclosure.

FIG. 6 is a flow chart of an exemplary memory management method 600, according to some embodiments of the present disclosure. Method 600 includes acquiring a virtual address (step 610), determining to access the kernel space or the user space (step 620), obtaining a first root page table index corresponding to the kernel space (step 631), obtaining a second root page table index corresponding to the user space (step 641), translating a first virtual address to a first physical address in accordance with the first root page table index for an operating system kernel (step 632), and translating a second virtual address to a second physical address in accordance with the second root page table index for a user process (step 642). Method 600 can also include obtaining a page-size indicator indicating a page size of the kernel space or the user space. Method 600 may also include obtaining a non-executable indicator for a page at the translated physical address. Method 600 may further include obtaining an access-user-space indication for the OS kernel or the user process.

Step 610 includes acquiring a virtual address. For example, acquiring the virtual address in step 610 may include obtaining a virtual address after decoding an instruction. As another example, acquiring the virtual address in step 610 may include obtaining the virtual address from an OS kernel or a user process for virtual-to-physical address mapping.

Step 620 includes determining to access the kernel space or the user space. For example, after obtaining a virtual address from an OS kernel in step 610, determining to access the kernel space or the user space in step 620 may include determining to access the kernel space as a default result. As another example, after obtaining a virtual address from a user process in step 610, determining to access the kernel space or the user space in step 620 may include determining to access the user space as a default result.

In some embodiments, method 600 may include obtaining an access-user-space indication for the OS kernel. After obtaining the access-user-space indication from the OS kernel, determining to access the kernel space or the user space in step 620 may include determining to access the user space.

Step 631 includes obtaining a root page table index corresponding to the kernel space. For example, obtaining the root page table index corresponding to the kernel space in step 631 may include obtaining a root page table index from a storing unit, such as a control register 3 (CR3), a control register 3 for an OS kernel (CR3K), or a storing space in a cache, main memory, or storage device, as illustrated in above.

In some embodiments, obtaining the root page table index corresponding to the kernel space in step 631 may also include reading a root page table index corresponding to the OS kernel from a storing unit, and storing it in a dedicated control register in a processor. For example, obtaining the root page table index corresponding to the kernel space in step 631 may include popping out the root page table index corresponding to the OS kernel from a stack for the OS kernel, and storing it in the CR3K. As another example, obtaining the root page table index corresponding to the kernel space in step 631 may include swapping in data that may include the root page table index of the OS kernel from storage 130, and storing it in control register 122 of processor 120.

Step 632 includes translating a virtual address to a physical address in accordance with the root page table index for an OS kernel. For example, translating the virtual address to the physical address for the OS kernel in step 632 may include translating virtual address 270 to physical address 290 for the OS kernel in accordance with the root page table index in control register 122 as illustrated in FIGS. 2A and 2B, and described above. As another example, translating the virtual address to the physical address for the OS kernel in step 632 may include translating virtual address 370 to physical address 390 in accordance with the root page table index stored in control register 122 for the OS kernel, as illustrated in FIGS. 3A and 3B, and described above.

In some embodiments, translating the virtual address to the physical address for the OS kernel in step 632 may include obtaining a base address in accordance with the root page table index of the OS kernel and the page directory index of the virtual address. For example, obtaining the base address in step 632 may include combining root address 210 with page directory index 271 of virtual address 270 to find page directory 223, as shown in FIGS. 2A and 2B. Page directory 223 may include a base address of page tables 240.

Translating the virtual address to the physical address for the OS kernel in step 632 can also include obtaining an entry address in accordance with the base address and the page table index. For example, obtaining the entry address in step 632 may include combining base address 230 with page table index 272 of virtual address 270 to find page table 242, as shown in FIGS. 2A and 2B. Page table 242 may include the entry address pointing to a position among page table entries. Obtaining the entry address in step 632 may also include reading contents of page table 242 to obtain entry address 250 pointing to page table entry 262 in page table entries 260.

Translating the virtual address to the physical address for the OS kernel in step 632 can further include obtaining a physical page index in accordance with the entry address. For example, obtaining the physical page index in step 632 may include reading the contents of page table entry 262 to obtain physical page index 291.

Translating the virtual address to the physical address for the OS kernel in step 632 may further include combining the physical page index and the page offset to be the physical address. For example, combining the physical page index and the page offset in step 632 may include combining physical page index 291 and page offset 293 to be physical address 290, as shown in FIG. 2A. Page offset 293 may be identical to page offset 273 of virtual address 270.

Translating the virtual address to the physical address for the OS kernel in step 632 can also include translating the virtual address to the physical address directly. In other words, the virtual address is identical to the physical address. For example, virtual address 270 in FIG. 2A may be translated to be physical address 290 directly without being translated through page directories 220, page tables 240, and page table entries 260 as shown in the figure.

As another example, translating the virtual address to the physical address for the OS kernel in step 632 can include translating virtual address 370 to physical address 390 as illustrated in FIGS. 3A and 3B, and described above.

Step 641 includes obtaining a root page table index corresponding to the user space. For example, obtaining the root page table index corresponding to the user space in step 641 may include obtaining a root page table index from a storing unit, such as a control register 4 (CR4), a control register 3 for a user process (CR3U), or a storing space in a cache, main memory, or storage device, as illustrated in above.

In some embodiments, obtaining the root page table index corresponding to the user space in step 641 may also include reading a root page table index corresponding to the user process from a storing unit, and storing it in a dedicated control register in a processor. For example, obtaining the root page table index corresponding to the user space in step 641 may include popping out the root page table index corresponding to the user process from a stack for the user process, and storing it in the CR3U. As another example, obtaining the root page table index corresponding to the user space in step 641 may include swapping in data that may include the root page table index of the user process from storage 130, and storing it in control register 124 of processor 120.

Step 642 includes translating a virtual address to a physical address in accordance with the root page table index for a user process. For example, translating the virtual address to the physical address for the user process in step 641 may include translating virtual address 470 to physical address 490 in accordance with the root page table index of the user process stored in control register 124, as illustrated in FIGS. 4A and 4B and described above. As another example, translating the virtual address to the physical address for the user process in step 642 may include translating virtual address 570 to physical address 590 in accordance with the root page table index stored in control register 124 for the user process as illustrated in FIGS. 5A and 5B, and described above.

Translating the virtual address to the physical address for the user process in step 642 may include obtaining a base address in accordance with the root page table index of the user process and the page directory index of the virtual address. For example, obtaining the base address in step 642 may include combining root address 410 with page directory index 471 of virtual address 470 to find page directory 423, as shown in FIGS. 4A and 4B. Page directory 423 may include a base address of page tables 440.

Translating the virtual address to the physical address for the user process in step 642 can also include obtaining an entry address in accordance with the base address and the page table index. For example, obtaining the entry address in step 642 may include combining base address 430 with page table index 472 of virtual address 470 to find page table 442, as shown in FIGS. 4A and 4B. Page table 442 may include the entry address pointing to a position among page table entries. Obtaining the entry address in step 642 may also include reading contents of page table 442 to obtain entry address 450 pointing to page table entry 462 in page table entries 460.

In some embodiments, translating the virtual address to the physical address for the user process in step 642 may further include obtaining a physical page index in accordance with the entry address. For example, obtaining the physical page index in step 642 may include reading the contents of page table entry 462 to obtain physical page index 491.

In some embodiments, translating the virtual address to the physical address for the user process in step 642 may further include combining the physical page index and the page offset to be the physical address. For example, combining the physical page index and the page offset in step 642 may include combining physical page index 491 and page offset 492 to be physical address 490, as shown in FIG. 4A. Page offset 492 may be identical to page offset 471 of virtual address 470.

Alternatively, translating the virtual address to the physical address for the user process in step 642 may include translating the virtual address to the physical address directly. In other words, the virtual address is identical to the physical address. For example, virtual address 470 in FIG. 4A may be translated to be physical address 490 directly without being translated through page directories 420, page tables 440, and page table entries 460 as shown in the figure.

As another example, translating the virtual address to the physical address for the user process in step 642 can include translating virtual address 570 to physical address 590 as illustrated in FIGS. 5A and 5B, and described above.

Method 600 can also include obtaining a page-size indicator indicating a page size of the kernel space or the user space. For example, obtaining the page-size indicator in method 600 may include reading a bit-7 of page attributes 262-2 in page table entry 262 as shown in FIG. 2B and described above. Bit-7 of page attribute 262-2 indicating a page size of the kernel space. For example, if the bit-7 of page attributes 262-2 is "1," the page size of the kernel space may be 4 KB. If the bit-7 of page attributes 262-2 is "0," the page size of the kernel space may be 4 MB.

When the obtained page-size indicator may indicate that the kernel space may include a first page size, translating the virtual address to the physical address in step 632 may include translating the virtual address to the physical address as illustrated in FIGS. 2A and 2B, and described above. For example, when the bit-7 of page attributes 262-2 is "1" indicating a 4-KB page size of the kernel space, translating the virtual address to the physical address in step 632 may include translating virtual address 270 to physical address 290 as described above and shown in FIG. 2A.

When the obtained page-size indicator may indicate that the kernel space may include a second page size, translating the virtual address to the physical address in step 632 may include translating the virtual address to the physical address as illustrated in FIG. 3A and described above. For example, when the bit-7 of page attributes 262-2 is "0" indicating a 4-MB page size of the kernel space, translating the virtual address to the physical address in step 632 may include translating virtual address 370 to physical address 390 through two-level page tables, page directories 320 and page table entries 360, as shown in FIGS. 3A and 3B, and described above.

As another example, obtaining the page-size indicator in method 600 may include reading a bit-7 of page attributes 462-2 in page table entry 462 as shown in FIG. 4B and described above. Bit-7 of page attribute 462-2 indicating a page size of the user space. For example, if the bit-7 of page attributes 462-2 is "1," the page size of the user space may be 4 KB. If the bit-7 of page attributes 462-2 is "0," the page size of the user space may be 4 MB.

When the obtained page-size indicator may indicate that the user space may include a first page size, translating the virtual address to the physical address in step 642 may include translating the virtual address to the physical address as illustrated in FIGS. 4A and 4B, and described above. For example, when the bit-7 of page attributes 462-2 is "1" indicating a 4-KB page size of the user space, translating the virtual address to the physical address in step 642 may include translating virtual address 470 to physical address 490 as described above and shown in FIG. 4A.

When the obtained page-size indicator may indicate that the user space may include a second page size, translating the virtual address to the physical address in step 642 may include translating the virtual address to the physical address as illustrated in FIGS. 5A and 5B, and described above. For example, when the bit-7 of page attributes 562-2 is "0" indicating a 4-MB page size of the user space, translating the virtual address to the physical address in step 642 may include translating virtual address 570 to physical address 590 through two-level page tables, page directories 520 and page table entries 560, as shown in FIG. 5A and described above.

Method 600 may also include obtaining a non-executable indicator for a page at the translated physical address. For example, obtaining the non-executable indicator in method 600 may include reading bit-2 of page attributes 262-2 in page table entry 262 as shown in FIG. 2B and described above. If the bit-2 of page attributes 262-2 is "1," the page at the translated physical address may not be executable. Method 600 may include not accessing contents of the page, or accessing the contents of the page, but not executing it. If the bit-2 of page attributes 262-2 is "0," the page at the translated physical address may be executable. Method 600 may include accessing the contents of the page in the kernel space and/or execute it accordingly.

As another example, obtaining the non-executable indicator in method 600 may include obtaining a non-executable indicator for the user space. For example, obtaining the non-executable indicator in method 600 may include reading bit-2 of page attributes 462-2 in page table entry 462, as described above and shown in FIG. 4B. If the bit-2 of page attributes 462-2 is "1," the page at the translated physical address may not be executable. Method 600 may include not accessing contents of the page, or accessing the contents of the page, but not executing it. If the bit-2 of page attributes 462-2 is "0," the page at the translated physical address may be executable. Method 600 may include accessing the contents of the page in the user space and/or execute it accordingly.

Method 600 may further include obtaining an access-user-space indication for the OS kernel or the user process. For example, processor 120 may include one or more instructions including a prefix "US" used to access the user space in its instruction set. The instruction including the prefix "US" may be used as the access-user-space indicator in the OS kernel. When an instruction with the "US" prefix may be executed, obtaining the root page table index in step 631 may include reading a root page table index corresponding to the user space in control register 124 for translating the virtual address to the physical address. For example, obtaining the root page table index in step 631 may include reading root address 410 corresponding to the user space from control register 124. And, translating the virtual address to the physical address in step 632 may include translating virtual address 270 to a physical address by using root address 410 and the three-level page table structure in FIG. 4A, as described above.

As another example, processor 120 may include one or more instructions including a prefix "US" used to access the user space in its instruction set. The instruction including the prefix "US" may be used as the access-user-space indicator in the user process. When an instruction with the "US" prefix may be executed for the user process, method 600 may further include setting a general protection fault because the instruction with the "US" prefix may be reserved for an OS kernel only. For example, method 600 may include setting a warning message or flag, and not executing the instruction with the "US" prefix for the user process.

Another aspect of the disclosure is directed to a non-transitory computer-readable medium storing a set of instructions that are executable by one or more processors of an apparatus to cause the apparatus to perform a method for memory management of a kernel space and a user space, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A system for memory management of a kernel space and a user space, the system comprising:
   a first register configured to store a first root page table index corresponding to the kernel space;
   a second register configured to store a second root page table index corresponding to the user space, wherein the second register is operable to store the second root page table index concurrently with the first register being operable to store the first root page table index, wherein the second root page table index is not stored concurrently with the first root page table index in the first register, and the first root page table index is not stored concurrently with the second root page table index in the second register; and
   a control unit communicatively coupled to the first and second registers and configured to:
      translate a first virtual address to a first physical address in accordance with the first root page table index for an operating system kernel; and
      translate a second virtual address to a second physical address in accordance with the second root page table index for a user process.

2. The system of claim 1, wherein the kernel space and the user space correspond to a same physical memory space, the same physical memory space being an entire physical memory space or a part of the entire physical memory space.

3. The system of claim 1, wherein:
the first virtual address includes:
a first page directory index, a first page table index, and a first page offset, or
a first page directory index and a first page offset; and
the second virtual address includes:
a second page directory index, a second page table index, and a second page offset, or
a second page directory index, a second page table index, and a second page offset.

4. The system of claim 3, wherein the control unit being configured to translate the first virtual address to the first physical address includes being configured to:
obtain a first base address in accordance with the first root page table index and the first page directory index;
obtain a first entry address in accordance with the first base address and the first page table index;
obtain a first physical page index in accordance with the first entry address; and
combine the first physical page index and the first page offset to be the first physical address.

5. The system of claim 3, wherein the control unit being configured to translate the first virtual address to the first physical address includes being configured to:
obtain a first page-size indicator indicating a page size of the kernel space, the page size of the kernel space including a first or a second kernel-space page size,
wherein responsive to the first page-size indicator indicating the first kernel-space page size, the control unit being configured to translate the first virtual address to the first physical address further includes being configured to:
obtain the first base address in accordance with the first root page table index and the first page directory index;
obtain the first entry address in accordance with the first base address and the first page table index;
obtain the first physical page index in accordance with the first entry address; and
combine the first physical page index and the first page offset to be the first physical address.

6. The system of claim 5,
wherein responsive to the first page-size indicator indicating the second kernel-space page size, the control unit being configured to translate the first virtual address to the first physical address further includes being configured to:
obtain the first entry address in accordance with the first root page table index and the first page directory index;
obtain the first physical page index in accordance with the first address; and
combine the first physical page index and the first page offset to be the first physical address.

7. The system of claim 3, wherein the control unit being configured to translate the second virtual address to the second physical address includes being configured to:
obtain a second base address in accordance with the second root page table index and the second page directory index;
obtain a second entry address in accordance with the second base address and the second page table index;
obtain a second physical page index in accordance with the second entry address; and
combine the second physical page index and the second page offset to be the second physical address.

8. The system of claim 3, wherein the control unit being configured to translate the second virtual address to the second physical address includes being configured to:
obtain a second page-size indicator indicating a page size of the user space, the page size of the user space including a first or a second user-space size,
wherein responsive to the second page-size indicator indicating the first user-space size, the control unit being configured to translate the second virtual address to the second physical address further includes being configured to:
obtain the second base address in accordance with the second root page table index and the second page directory index;
obtain the second entry address in accordance with the second base address and the second page table index;
obtain the second physical page index in accordance with the second entry address; and
combine the second physical page index and the second page offset to be the second physical address.

9. The system of claim 8,
wherein responsive to the second page-size indicator indicating the second user-space size, the control unit being configured to translate the second virtual address to the second physical address further includes being configured to:
obtain the second entry address in accordance with the second root page table index and the second page directory index;
obtain the second physical page index in accordance with the second entry address; and
combine the second physical page index and the second page offset to be the second physical address.

10. The system of claim 3, wherein the control unit being configured to translate the first virtual address to the first physical address includes being configured to:
obtain a first access-user-space indication;
obtain the second base address in accordance with the second root page table index and the first page directory index;
obtain the second entry address in accordance with the second base address and the first page table index;
obtain the second physical page index in accordance with the second entry address; and
combine the second physical page index and the first page offset to be the second physical address.

11. The system of claim 1, wherein the control unit being configured to translate the first virtual address to the first physical address further includes being configured to:
obtain a first non-executable indicator indicating a page at the first physical address is not executable.

12. The system of claim 1, wherein the control unit being configured to translate the second virtual address to the second physical address further includes being configured to:
obtain a second non-executable indicator indicating a page at the second physical address is not executable.

13. The system of claim 1, wherein the control unit being configured to translate the second virtual address to the second physical address includes being configured to:
obtain a second access-user-space indication; and
set a general protection fault.

14. The system of claim 1, wherein the control unit being configured to translate the first virtual address to the first physical address includes being configured to:
translate the first virtual address to be the first physical address directly.

15. The system of claim 1, wherein the control unit being configured to translate the second virtual address to the second physical address includes being configured to:
  translate the second virtual address to be the second physical address directly.

16. A method for memory management of a kernel space and a user space, the method comprising:
  storing a first root page table index corresponding to the kernel space, wherein:
    the first root table index is different from a second root page table index corresponding to the user space, and
    the first root page table index is stored in a first register concurrently with the second root page table index being stored in a second register, wherein the second root page table index is not stored concurrently with the first root page table index in the first register, and the first root page table index is not stored concurrently with the second root page table index in the second register; and
  translating a first virtual address to a first physical address in accordance with the first root page table index for an operating system kernel.

17. The method of claim 16, wherein the kernel space and the user space correspond to a same physical memory space, the same physical memory space being an entire physical memory space or a part of the entire physical memory space.

18. The method of claim 16, wherein:
  the first virtual address includes:
  a first page directory index, a first page table index, and a first page offset, or a first page directory index and a first page offset.

19. The method of claim 18, wherein translating the first virtual address to the first physical address includes:
  obtaining a first base address in accordance with the first root page table index and the first page directory index;
  obtaining a first entry address in accordance with the first base address and the first page table index;
  obtaining a first physical page index in accordance with the first entry; and
  combining the first physical page index and the first page offset to be the first physical address.

20. The method of claim 18, wherein translating the first virtual address to the first physical address includes:
  obtaining a first page-size indicator indicating a page size of the kernel space, the page size of the kernel space including a first or a second kernel-space page size,
  wherein responsive to the first page-size indicator indicating the first kernel-space page size, translating the first virtual address to the first physical address further includes:
    obtaining the first base address in accordance with the first root page table index and the first page directory index;
    obtaining the first entry address in accordance with the first base address and the first page table index;
    obtaining the first physical page index in accordance with the first entry address; and
    combining the first physical page index and the first page offset to be the first physical address.

21. The method of claim 20,
  wherein responsive to the first page-size indicator indicating the second kernel-space page size, translating the first virtual address to the first physical address includes:
    obtaining the first entry address in accordance with the first root page table index and the first page directory index;
    obtaining the first physical page index in accordance with the first address; and
    combining the first physical page index and the first page offset to be the first physical address.

22. The method of claim 16, wherein translating the first virtual address to the first physical address further includes:
  obtaining a first non-executable indicator indicating a page at the first physical address is not executable.

23. The method of claim 16, further comprising:
  storing the second root page table index corresponding to the user space; and
  translating a second virtual address to a second physical address in accordance with the second root page table index for a user process.

24. The method of claim 23, wherein translating the second virtual address to the second physical address further includes:
  obtaining a second non-executable indicator indicating a page at the second physical address is not executable.

25. The method of claim 23, wherein translating the second virtual address to the second physical address includes:
  translating the second virtual address to be the second physical address directly.

26. The method of claim 23, wherein:
  the first virtual address includes:
    the first page directory index, the first page table index, and the first page offset, or
    the first page directory index and the first page offset;
  the second virtual address includes:
    the second page directory index, the second page table index, and the second page offset, or
    the second page directory index, the second page table index, and the second page offset; and
  translating the first virtual address to the first physical address includes:
    obtaining a first access-user-space indication,
    obtaining the second base address in accordance with the second root page table index and the first page directory index;
    obtaining the second entry address in accordance with the second base address and the first page table index;
    obtaining the second physical page index in accordance with the second entry address; and
    combining the second physical page index and the first page offset to be the second physical address.

27. The method of claim 23, wherein translating the second virtual address to the second physical address includes:
  obtaining a second access-user-space indication; and
  setting a general protection fault.

28. The method of claim 16, wherein:
  the second virtual address includes:
    a second page directory index, a second page table index, and a second page offset, or
    a second page directory index, a second page table index, and a second page offset.

29. The method of claim 28, wherein translating the second virtual address to the second physical address includes:
  obtaining a second base address in accordance with the second root page table index and the second page directory index;
  obtaining a second entry address in accordance with the second base address and the second page table index;

obtaining a second physical page index in accordance with the second entry address; and combining the second physical page index and the second page offset to be the second physical address.

30. The method of claim 28, wherein translating the second virtual address to the second physical address includes:

obtaining a second page-size indicator indicating a page size of the user space, the page size of the user space including a first or a second user-space size, wherein responsive to the second page-size indicator indicating the first user-space size, translating the second virtual address to the second physical address further includes:

obtaining the second base address in accordance with the second root page table index and the second page directory index;

obtaining the second entry address in accordance with the second base address and the second page table index;

obtaining the second physical page index in accordance with the second entry address; and combining the second physical page index and the second page offset to be the second physical address.

31. The method of claim 30, wherein responsive to the second page-size indicator indicating the second user-space size, translating the second virtual address to the second physical address includes:

obtaining the second entry address in accordance with the second root page table index and the second page directory index;

obtaining the second physical page index in accordance with the second entry address; and combining the second physical page index and the second page offset to be the second physical address.

32. The method of claim 16, wherein translating the first virtual address to the first physical address includes:

translating the first virtual address to be the first physical address directly.

33. A non-transitory computer-readable medium storing a set of instructions that are executable by one or more processors of an apparatus to cause the apparatus to perform a method for memory management of a kernel space and a user space, the method comprising:

storing a first root page table index corresponding to the kernel space, wherein:

the first root table index is different from a second root page table index corresponding to the user space, and the first root page table index is stored in a first register concurrently with the second root page table index being stored in a second register, wherein the second root page table index is not stored concurrently with the first root page table index in the first register, and the first root page table index is not stored concurrently with the second root page table index in the second register; and translating a first virtual address to a first physical address in accordance with the first root page table index for an operating system kernel.

* * * * *